US005984519A

United States Patent [19]

Onodera et al.

[11] Patent Number: 5,984,519

[45] Date of Patent: Nov. 16, 1999

[54] FINE PARTICLE PRODUCING DEVICES

[75] Inventors: Tadao Onodera; Chikara Kannari; Akikazu Koyano; Yoshihiro Furukawa; Kazutoshi Mitake; Fumio Yasuda; Fuminori Miyake, all of Itabashi-ku; Fusamitsu Fujishima, Ichikawa, all of Japan

[73] Assignees: Genus Corporation, Tokyo-to; Hakusui Tech Co., Ltd., Osaka-fu, both of Japan

[21] Appl. No.: 08/995,347

[22] Filed: Dec. 22, 1997

[30] Foreign Application Priority Data

| | | | |
|---|---|---|---|
| Dec. 26, 1996 | [JP] | Japan | 8-349002 |
| Dec. 26, 1996 | [JP] | Japan | 8-349003 |
| Dec. 26, 1996 | [JP] | Japan | 8-349004 |

[51] Int. Cl.[6] .............................. B01F 5/06; B01F 15/02; B01J 13/00

[52] U.S. Cl. .................. 366/340; 366/165.2; 366/176.1; 366/338; 516/51; 516/56; 516/90

[58] Field of Search ......................... 252/314; 366/165.2, 366/176.1, 338, 340; 516/51, 56, 90; 241/16

[56] References Cited

U.S. PATENT DOCUMENTS

| | | | |
|---|---|---|---|
| 1,496,858 | 6/1924 | Knollenberg | 252/314 |
| 2,882,025 | 4/1959 | Loo | 366/176.1 X |
| 3,079,133 | 2/1963 | Wilsman | 366/176.1 |
| 3,179,385 | 4/1965 | Deackoff | 426/519 |
| 3,856,270 | 12/1974 | Hemker | 366/340 |
| 3,941,355 | 3/1976 | Simpson | 366/99 |
| 4,087,862 | 5/1978 | Tsien | 366/165.1 |
| 4,218,012 | 8/1980 | Hamza et al. | 366/165.2 X |
| 4,514,095 | 4/1985 | Ehrfeld et al. | 366/340 |
| 4,533,254 | 8/1985 | Cook et al. | 366/176.1 |
| 4,684,254 | 8/1987 | Goudy, Jr. | 366/340 |
| 4,890,771 | 1/1990 | Morel et al. | 222/137 |
| 5,056,715 | 10/1991 | Korsmeyer | 366/176.1 X |
| 5,720,551 | 2/1998 | Shechter | 366/176.1 X |
| 5,887,977 | 3/1999 | Morikawa | 366/340 |

FOREIGN PATENT DOCUMENTS

| | | | |
|---|---|---|---|
| 401094933 | 4/1989 | Japan | 366/176.1 |
| 2-251525 | 10/1990 | Japan . | |
| WO8803052 | 5/1988 | WIPO . | |

OTHER PUBLICATIONS

Pamphlet of Nanomizer LA, Japan (along with a partial English translation), Dec. 1991.

*Primary Examiner*—Richard D. Lovering
*Attorney, Agent, or Firm*—Jordan and Hamburg LLP

[57] ABSTRACT

In a fine particle producing device, particles of a substance contained in a fluid are caused to collide with each other under extremely high pressure, whereby the particles are emulsified, dispersed or reduced to finer particles in the fluid in an instant. One of the blocks mounted in a cylindrical sealed casing has a pair of curved channel portions for guiding converging high-speed fluid streams and a turbulence pocket formed at a position where the curved channel portions are joined for temporarily holding fluid turbulence caused by collision of the high-speed fluid streams.

5 Claims, 18 Drawing Sheets

FIG. 9
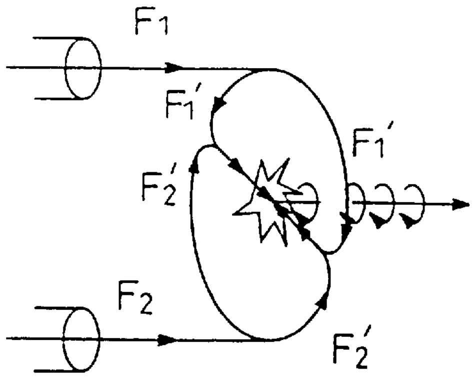
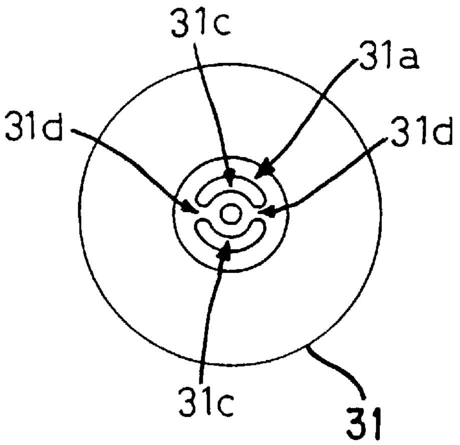
FIG. 10A
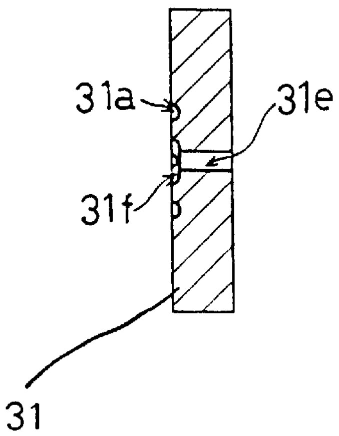
FIG. 10B

FINE PARTICLE PRODUCING DEVICES

BACKGROUND OF THE INVENTION

The present invention relates to fine particle producing devices for reducing various kinds of materials to tiny particles. More particularly, it is concerned with fine particle producing devices in which particles of a substance contained in a liquid are caused to collide with each other under extremely high pressure, whereby the particles are emulsified, dispersed or reduced to finer particles in the liquid in an instant.

An example of conventional fine particle producing devices of this kind is an emulsifier disclosed in Japanese Unexamined Patent Publication No. 2-261525. In the emulsifier of the disclosure, two flow guiding blocks 90, 91 formed of a hard material are fitted side by side in a passage of a liquid mixture as shown in FIG. 26. The first flow guiding block 90 placed on an upstream side has a pair of through holes 90*a*, 90*b* and a first groove-like channel 90*c* connecting downstream openings of the two through holes 90*a*, 90*b* to each other. On the other hand, the second flow guiding block 91 mounted on a downstream side in close contact with the first flow guiding block 90 has a second groove-like channel 91*c* which runs at right angles with the first groove-like channel 90*c* and a pair of through holes 91*a*, 91*b* formed at both ends of the second groove-like channel 91*c* to allow the liquid mixture to flow downstream. When the liquid mixture is passed through the first and second flow guiding blocks 90, 91 under high pressure, a pair of streams of the liquid mixture directed in opposite directions are produced and the accelerated streams are caused to collide with each other to accomplish emulsification.

Although an abrasion-resistant material such as sintered diamond or artificial sapphire is used in the first and second flow guiding blocks 90, 91 in the conventional emulsifier, the first and second groove-like channels 90*c*, 91*c* remarkably wear out at their central portions where the streams of the liquid mixture collide at maximum speed. Thus, continuous operation of the emulsifier inevitably results in a rapid deterioration of the emulsifier's particle size reducing performance. It is therefore essential to replace the expensive flow guiding blocks 90, 91 from time to time to maintain emulsification performance. In these circumstances, there has been a need for flow guiding blocks which would provide a prolonged service life.

Another problem of the aforementioned conventional emulsifier is that it is impossible to reduce its physical size and thereby achieve energy savings, because a pump for pressurizing the liquid mixture can not be reduced in size and power without affecting the particle size reducing performance.

SUMMARY OF THE INVENTION

It is an object of the present invention to provide a fine particle producing device and system which have overcome the aforementioned problems of the conventional fine particle producing devices.

According to an aspect of the invention, a fine particle producing device comprises a cylindrical sealed casing having an inlet port and an outlet port, and a plurality of blocks mounted side by side within the cylindrical sealed casing, the blocks having channels which forcibly alter flow directions of a fluid to be treated, in which the fluid containing a substance to be divided into fine particles is introduced into the cylindrical sealed casing through its inlet port in a high-pressure state and guided through the channels of the blocks to create multiple fluid streams, which are converted into converging high-speed fluid streams, caused to collide with each other to produce fine particles of the substance, and discharged from the cylindrical sealed casing through its outlet port, at least one of the blocks having curved channel portions for guiding the converging high-speed fluid streams and a turbulence pocket formed at a position where the curved channel portions are joined for temporarily holding fluid turbulence caused by collision of the high-speed fluid streams.

The fine particle producing device can exhibit stable particle size reducing performance for an extended period of time by reducing abrasion of those portions of flow guiding blocks where fluid streams collide, and enables energy savings as a result of an improved particle size reducing effect.

These and other objects, features and advantages of the invention will become more apparent upon reading the following detailed description in conjunction with the accompanying drawings.

BRIEF DESCRIPTION OF THE DRAWINGS

FIG. 9 is a schematic diagram illustrating fluid flows produced by a block pair;

FIGS. 10A and 10B are diagrams showing a second block according to one variation of the second embodiment;

DETAILED DESCRIPTION OF THE PREFERRED EMBODIMENTS OF THE INVENTION

Figure 1:
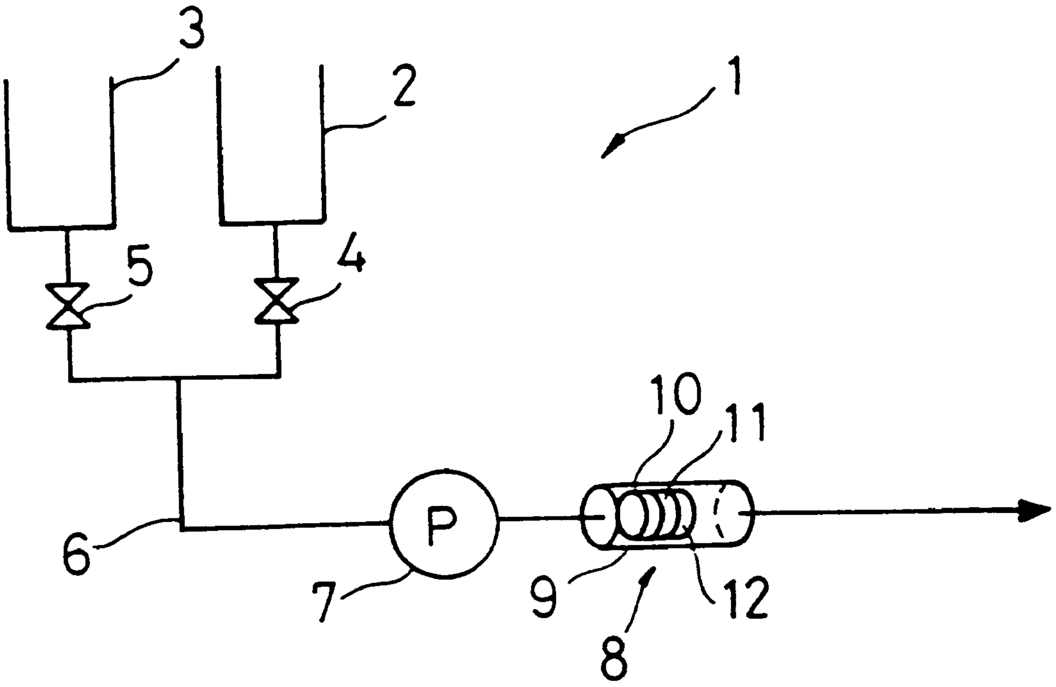
FIG. 1 is a general configuration diagram showing a fine particle producing device and its associated elements according to the invention.

First of all, main constructional features of a fine particle producing device of the invention will be described. A fine particle producing device includes a cylindrical sealed casing having an inlet port and an outlet port and a plurality of blocks mounted side by side within the cylindrical sealed casing, the blocks having channels which forcibly alter flow directions of a fluid to be treated.

The fluid containing a substance to be divided into fine particles is introduced into the cylindrical sealed casing through its inlet port in a high-pressure state and guided through the channels of the blocks to create multiple fluid streams, which are converted into converging high-speed fluid streams, caused to collide with each other to produce fine particles of the substance, and discharged from the cylindrical sealed casing through its outlet port, at least one of the blocks having curved channel portions for guiding the converging high-speed fluid streams and a turbulence pocket formed at a position where the curved channel portions are joined for temporarily holding fluid turbulence caused by collision of the high-speed fluid streams.

The blocks may include a fluid inflow block, an intermediate block and a fluid outflow block, each formed into a disklike shape. The fluid inflow block has through holes for separating the fluid to be treated into a plurality of fluid streams flowing parallel to an axial direction, a first S-shaped channel formed in a downstream side surface of the fluid inflow block which comes in contact with the intermediate block, the first S-shaped channel connecting downstream openings of the through holes in an S shape to provide the fluid streams with a rotating force, and a turbulence pocket forming a closed-bottom cylindrical hole at a middle part of the first S-shaped channel. The intermediate block has a turbulent flow passage formed at a location corresponding to the turbulence pocket formed in the fluid inflow block. The fluid outflow block has a turbulence pocket forming a closed-bottom cylindrical hole at a location corresponding to the turbulent flow passage, a second S-shaped channel extending from the turbulence pocket formed in the fluid outflow block toward its periphery, and a plurality of through holes formed parallel to the axial direction from each end of the second S-shaped channel.

Also, the curved channel portions form together a circular channel. The turbulence pocket may be located inside this circular channel to form a fluid colliding region therein. Fluid squirting openings through which the high-speed fluid streams are introduced into the turbulence pocket in fanlike jets are formed in a wall separating the circular channel and the turbulence pocket from each other.

Preferably, each of the fluid-carrying channels of the fine particle producing device may have a semicircular or U-shaped cross section. It is also preferable that the blocks be formed of an abrasion-resistant material, such as a ceramic, cemented carbide or diamond. The fluid to be treated is a liquid-based mixture containing a liquid substance or a solid powder substance. When the substance is a liquid, it is emulsified. When the substance is solid powder, it is dispersed in the mixture or divided into finer particles. Exemplary emulsification applications are processes of emulsifying various hydrophobic substances in water and of various hydrophilic substances in oil. Exemplary dispersion applications are processes of dividing agglomerates of particles of a metallic oxide or inorganic or organic pigment in a liquid. Exemplary fine particle producing applications are processes of reducing the particle size of a metallic oxide or inorganic or organic pigment in a liquid. To produce colliding high-speed streams of the fluid to be treated, it is preferable that the fluid to be introduced into the fine particle producing device be pressurized to 100 to 3000 kgf/cm$^2$, for instance, by using a high-pressure pump.

While the minimum number of through holes formed in the fluid inflow block and the fluid outflow block is two each, there may be made more than two through holes in each block.

The fluid to be treated guided from the through holes into the first S-shaped channel may be accelerated and converted to the fluid streams. These fluid streams provided with a rotating force collide with each other and a resultant spirally whirling turbulent flow is temporarily held within the turbulence pocket. The turbulent flow is guided through the turbulent flow passage formed in the intermediate block while maintaining a state of turbulence but gradually loosing its rotating force. As the turbulent flow collides with walls of the turbulence pocket formed in the fluid outflow block, the dispersed phase is divided into finer particles. As the fluid flows into the second S-shaped channel at right angles to the axial direction, the rotating force of the turbulent flow is decreased, and the fluid transferred downstream through the through holes formed in the fluid outflow block.

Also, the fluid to be treated may be flowed along the circular channel and introduced into the turbulence pocket in fanlike jets through a plurality of fluid squirting openings formed in the wall separating the circular channel and the turbulence pocket from each other. The fanlike jets of the fluid are caused to collide and mixed with each other in the turbulence pocket, where they are reduced into fine particles.

Further, there may be a fine particle producing system including the fine particle producing device and a pretreatment unit connected to the inlet port of the fine particle producing device. The pretreatment unit is provided with a cylindrical sealed casing having an inlet port and an outlet port, a pair of plates arranged face to face with a clearance in between within the cylindrical sealed casing along its axial direction, a fluid passage regulating mechanism for moving one of the pair of plates in the axial direction, a fluid inflow passage for directing the fluid to be treated from a peripheral area of the pair of plates toward their middle part, thereby producing converging high-speed fluid streams and causing them to collide with each other, and a fluid outflow passage for sending fluid masses after collision toward the outlet port.

Preferably, each of the plates of the fine particle producing system may be formed of an abrasion-resistant material.

Also, a plurality of pretreatment units as described may be connected in series. The clearance between the pair of plates of each successive pretreatment unit is made progressively smaller along the direction of fluid flow.

Further, the fluid to be treated may be directed from the peripheral area of the pair of plates toward the middle part of the clearance between the plates. The high-speed fluid streams converging to the middle part are produced. These high-speed fluid streams meet and collide with each other in the middle part of the clearance, and a substance to be reduced in size are converted into smaller particles as a result of the collision. The fluid containing the smaller particles is then discharged through the fluid outflow passage. In this system, it is possible to adjust the level of particle size reduction because the clearance between the pair of plates can be varied by operating the fluid passage regulating mechanism. Thus, when the fluid to be treated contains large-sized particles which can potentially cause a clogging of fluid paths, the fluid may be preprocessed by the pretreatment unit so that particle size reducing operation can be completed with a single pass through the fine particle producing system.

Next, its specific preferable embodiments of the invention will be described with reference to the attached drawings.

FIGS. 1 to 6 are diagrams showing a fine particle producing device 8 according to a first embodiment of the invention; FIGS. 7 to 13 are diagrams showing a fine particle producing device 20 according to a second embodiment of the invention; FIGS. 14 to 18 are diagrams showing a pretreatment unit 40 employed in a fine particle producing system according to a third embodiment of the invention; and FIGS. 19 to 25 are diagrams showing a fine particle producing device according to a fourth embodiment of the invention which provides enhanced particle size reducing efficiency.

FINE PARTICLE PRODUCING DEVICE ACCORDING TO THE FIRST EMBODIMENT

In a configuration shown in FIG. 1, a water-based fluid and an oil-based fluid supplied from separate sources are introduced into a confluent pipe 6 to form a liquid mixture, and this liquid mixture is sent to the fine particle producing device 8 by a high-pressure pump 7 to achieve emulsification, dispersion or a reduction in particle size. More particularly, the water-based fluid and the oil-based fluid are supplied from containers 2 and 3 at flow rates regulated by valves 4 and 5, respectively. The liquid mixture is lead through the pipe 6 to an intake port of the high-pressure pump 7. The high-pressure pump 7 pressurizes the liquid mixture to 1000 to 1500 kgf/cm$^2$ and delivers it to the fine particle producing device 8.

Figure 2:
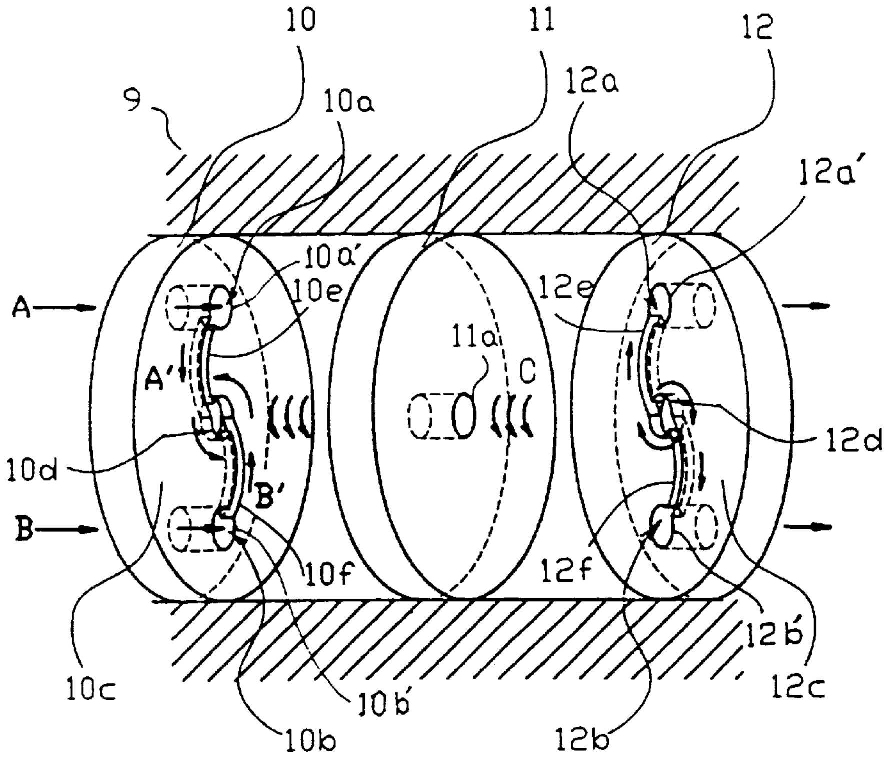
FIG. 2 is an exploded view of the fine particle producing device according to a first embodiment of the invention.

The fine particle producing device 8 comprises, as shown in an exploded view of FIG. 2, a disklike fluid inflow block 10, a disklike intermediate block 11 and a disklike fluid out flow block 12 which are arranged side by side in this order in a cylindrical sealed casing 9 having an inlet port and an outlet port, the sealed casing 9 forming part of a passage of liquid flow. Although the three blocks 10–12 are arranged in close contact with one another in actuality, they are shown separately in FIG. 2 for ease of explanation. Furthermore, the fluid outflow block 12 is flipped as if it is seen from a different point of view from the other two blocks 10, 11, in order that a fluid channel structure produced on an upstream side of the fluid outflow block 12 can easily be recognized.

The fluid inflow block 10 is formed of an abrasion-resistant material, such as a ceramic, cemented carbide or diamond, and measures 10 mm in diameter and 3 mm in thickness. A pair of through holes 10*a*, 10*b*, each measuring 0.5 mm in diameter, are formed in the fluid inflow block 10 at the same distance from its center. A turbulence pocket 10*d* forming a closed-bottom cylindrical hole measuring 0.05 mm deep is made at a central portion of a downstream side 10*c* of the fluid inflow block 10.

A downstream opening 10*a* of the through hole 10*a* is connected to the turbulence pocket 10*d* by a curved channel 10*e* while a downstream opening 10*b* ' of the through hole 10*b* is connected to the turbulence pocket 10*d* by a curved channel 10*f*. Measuring 0.1 mm in width and 0.05 mm in depth, these inflow curved channels 10*e* and 10*f* form together an S shape (as seen from the downstream side) that connects the through holes 10*a* and 10*b* to each other. More particularly, the curved channel 10*e* extends out from the circumference of the turbulence pocket 10*d* in its tangential direction and is gradually curved toward the downstream opening 10*a*', while the curved channel 10*f* is rotationally symmetrical with the curved channel 10*e* about the turbulence pocket 10*d*, that is, the curved channel 10*f* overlies the curved channel 10*e* when rotated by about 180 degrees about the turbulence pocket 10*d*. This configuration produces a pair of liquid streams A', B' that flow into the turbulence pocket 10*d* from opposite directions, thereby providing the liquid mixture with rotational energy.

The intermediate block 11 is formed of the same material as the fluid inflow block 10 and has the same diameter and thickness as the fluid inflow block 10. A turbulent flow passage 11*a* is formed in the intermediate block 11 at a location corresponding to the turbulence pocket 10*d*. The turbulent flow passage 11*a* measures 0.14 mm in diameter and has a larger cross-sectional area than the sum of the cross-sectional areas of the curved channels 10*e* and 10*f*.

The fluid outflow block 12 is formed of the same material as the fluid inflow block 10 and has the same diameter and thickness as the fluid inflow block 10. A pair of through holes 12*a*, 12*b*, each measuring 0.6 mm in diameter, are formed in the fluid outflow block 12 at the same distance from its center, and a turbulence pocket 12*d* forming a closed-bottom cylindrical hole is made at a central portion of an upstream side 12*c* of the fluid outflow block 12. An upstream opening 12*a*' of the through hole 12*a* is connected to the turbulence pocket 12*d* by a curved channel 12*e* while an upstream opening 12*b*' of the through hole 12*b* is connected to the turbulence pocket 12*d* by a curved channel 12*f*. These outflow curved channels 12*e* and 12*f* form together a reversed S shape (as seen from the downstream side) that connects the through holes 12*a* and 12*b* to each other. In this construction, a spirally whirling turbulent flow C moving downstream along the axis of the sealed casing 9 is directed outward along the upstream side 12*c* of the fluid outflow block 12, thereby decreasing the rotational energy.

The flow velocity of the liquid streams A', B' through the curved channels 10*e*, 10*f* of the fluid inflow block 10 can be set to a desired value by properly selecting the diameter of the turbulent flow passage 11*a* formed in the intermediate block 11.

Figure 3:
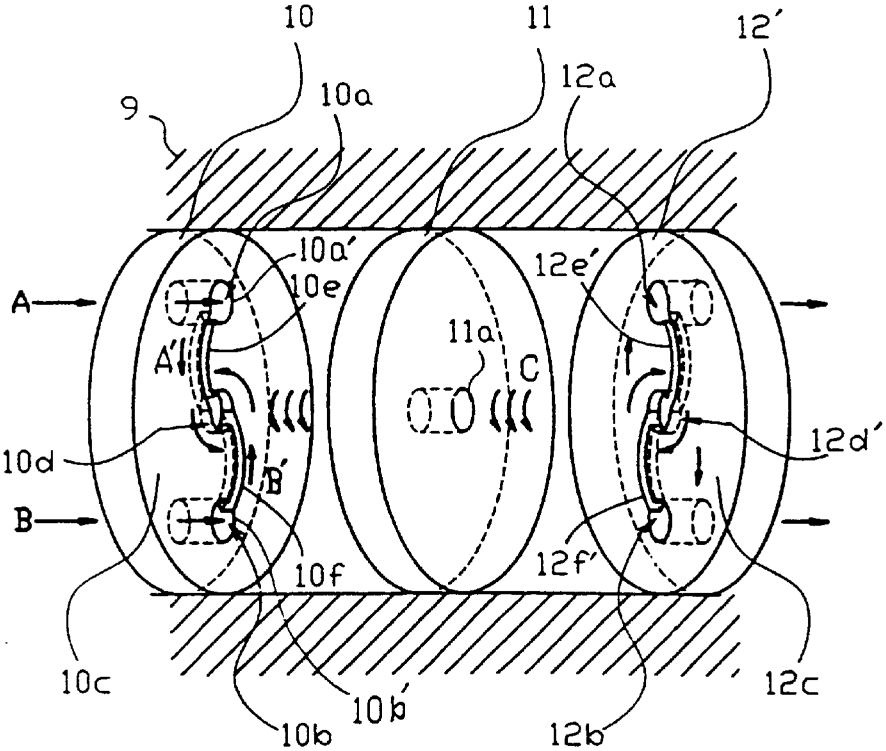
FIG. 3 is an exploded view of a fine particle producing device according to one variation of the first embodiment.

FIG. 3 shows one variation of the first embodiment, in which groove-like curved channels 12$e$' and 12$f$' made in a fluid out flow block 12' form together an S shape (as seen from the downstream side). The fluid outflow block 12' of FIG. 3 has the capability to decrease the rotational energy of the fluid flow to a greater extent than the fluid outflow block 12 of FIG. 2.

Operation of the fine particle producing device 8 of the first embodiment is now described with reference to FIGS. 1 and 2. When the liquid mixture pressurized by the high-pressure pump 7 is introduced into the fine particle producing device 8, it is separated into two streams A and B in the sealed casing 9. The two-way streams A and B pass through the through holes 10$a$ and 10$b$, respectively, and hit against a surface of the intermediate block 11. Then, they are directed toward the center of the fluid inflow block 10 along the curved channels 10$e$ and 10$f$.

The inward streams A' and B' of the liquid mixture are accelerated as they pass through the curved channels 10$e$ and 10$f$ and enter the turbulence pocket 10$d$ from its opposite tangential directions. As a consequence, the liquid streams A' and B' flow into the turbulence pocket 10$d$ as high-speed jets, colliding and mixing with each other. At this point, droplets of a dispersed phase, which may either be the oil-based fluid or the water-based fluid depending on which fluid is predominant in the liquid mixture, are divided into fine particles and the spirally whirling turbulent flow C is generated.

Liquid masses of the turbulent flow C that temporarily stay within the turbulence pocket 10$d$ are guided through the turbulent flow passage 11$a$ into the turbulence pocket 12$d$ of the fluid outflow block 12, maintaining spirally whirling motion. Since the turbulent flow passage 11$a$ has a larger cross-sectional area than the sum of the cross-sectional areas of the curved channels 10$e$ and 10$f$, impact energy is decreased in the turbulent flow passage 11$a$ and, therefore, abrasion caused by a fluid flow in the turbulence pocket 12$d$, which is a fluid colliding portion of the fluid outflow block 12, is substantially reduced.

As the turbulent flow C collides with walls of the turbulence pocket 12$d$ formed in the fluid outflow block 12, the dispersed phase is divided into finer particles. This liquid mixture branches out into the curved channels 12$e$ and 12$f$. The rotational energy which has caused the whirling motion of the turbulent flow C is decreased as the fluid flow is separated into two streams directed at right angles to the turbulent flow C. The liquid mixture is then transferred downstream through the through holes 12$a$ and 12$b$ of the fluid outflow block 12.

Results of emulsification, dispersion and particle size reduction tests carried out by using the aforementioned fine particle producing device 8 are described below. Results of tests conducted under the same test conditions by using the Model M-11OY of Microfluidizer Corporation (hereinafter abbreviated as M Corp.) and the Model LA-33 of Namomizer Corporation (hereinafter abbreviated as N Corp.) are also presented to provide comparative examples.

Measuring equipment:

Laser diffractometric particle size distribution analyzer Model SALD-2000A manufactured by Simazu Corporation Test procedure:

(1) 200 cubic centimeters (cc) of purified water was placed in an agitating tank of the measuring equipment and circulated therein.

(2) Small quantities of each test-sample were added in progressive steps until the peak of a diffraction-scattered light intensity graph reached 40%.

(3) After circulation was performed for one hour, a measurement start key was pressed.

Evaluation method:

Among other measurement items, particle size was evaluated based on the median of particle diameters.

(a) Emulsification Tests

Sample 1

1. Contents of Sample (1) Soybean oil, 20 wt % (Raw material for cosmetics 43011-2401 manufactured by Junsei Chemical Co., Ltd.)

(2) Lecithin derived from soybean, 1 wt % (86015-1201 manufactured by Junsei Chemical Co., Ltd.)

(3) Purified water, 79 wt % (91308-2163 manufactured by Junsei Chemical Co., Ltd.)

2. Pretreatment Procedure (1) Soybean lecithin was added to purified water which had been heated to 60° C.

(2) The mixture obtained in step (1) above was stirred to dissolve the lecithin by using a bench mixer (Model RW20-DZM manufactured by IKA Corporation) which was set to 1200 r.p.m.

(3) Soybean oil was added to the mixture obtained in step (2) above and a resultant mixture was stirred at 2000 r.p.m. for three minutes by the aforementioned bench mixer to achieve preliminary emulsification.

3. Median of Particle Diameters before Treatment: 20.127 micrometers

4. Test results

| Device tested | Treatment pressure (kgf/cm$^2$) | No. of passes | Median of particle dia. ($\mu$m) |
|---|---|---|---|
| Device of M Corp. | 1000 | 3 | 0.542 |
| Device of N Corp. | 1000 | 3 | 0.436 |
| Device of this invention | 1000 | 3 | 0.198 |

Sample 2

1. Contents of Sample (1) Liquid paraffin, 25 wt % (83640-0430 manufactured by Junsei Chemical Co., Ltd.)

(2) Polyoxyethylene(20)sorbitan monolaurate, 2 wt % (69295-1610 manufactured by Junsei Chemical Co., Ltd.)

(3) Purified water, 73 wt % (91308-2163 manufactured by Junsei Chemical Co., Ltd.)

2. Pretreatment Procedure (1) Polyoxyethylene (20) sorbitan monolaurate was added to purified water.

(2) The mixture obtained in step (1) above was stirred at 1200 r.p.m. by the aforementioned bench mixer to dissolve Polyoxyethylene (20) sorbitan monolaurate.

(3) Liquid paraffin was added to the mixture obtained in step (2) above and a resultant mixture was stirred at 1800 r.p.m. for three minutes by the bench mixer to achieve preliminary emulsification.

3. Median of Particle Diameters before Treatment: 32.989 micrometers

4. Test results

| Device tested | Treatment pressure ($kgf/cm^2$) | No. of passes | Median of particle dia. ($\mu m$) |
|---|---|---|---|
| Device of M Corp. | 1300 | 5 | 0.224 |
| Device of N Corp. | 1300 | 5 | 0.257 |
| Device of this invention | 1300 | 5 | 0.070 |

(b) Dispersion Tests

Sample 1

1. Contents of Sample (1) Titanium oxide, 15 wt % (53145-0601 manufactured by Junsei Chemical Co., Ltd.)

(2) Demole EP, 1 wt % (Special polycarboxylic acid type high-molecular surface active agent manufactured by Kao Corporation)

(3) Purified water, 84 wt % (91308-2163 manufactured by Junsei Chemical Co., Ltd.)

2. Pretreatment Procedure (1) Demole EP was added to purified water.

(2) The mixture obtained in step (1) above was stirred at 1000 r.p.m. by the aforementioned bench mixer to dissolve Demole EP.

(3) Titanium oxide was added to the mixture obtained in step (2) above and a resultant mixture was stirred at 2000 r.p.m. for one minute by the bench mixer to achieve preliminary dispersion.

3. Median of Particle Diameters before Treatment: 9.008 micrometers

4. Test results

| Device tested | Treatment pressure ($kgf/cm^2$) | No. of passes | Median of particle dia. ($\mu m$) |
|---|---|---|---|
| Device of M Corp. | 1300 | 2 | 0.496 |
| Device of N Corp. | 1300 | 2 | 0.558 |
| Device of this invention | 1300 | 2 | 0.066 |

Sample 2

1. Contents of Sample (1) Phthalocyanine blue, 25 wt % (63280-1610 manufactured by Junsei Chemical Co., Ltd.)

(2) Demole EP, 1 wt % (manufactured by Kao Corporation)

(3) Purified water, 74 wt % (91308-2163 manufactured by Junsei Chemical Co., Ltd.)

2. Pretreatment Procedure (1) Demole EP was added to purified water.

(2) The mixture obtained in step (1) above was stirred at 1000 r.p.m. by the aforementioned bench mixer to dissolve Demole EP.

(3) Phthalocyanine blue was added to the mixture obtained in step (2) above and a resultant mixture was stirred at 1500 r.p.m. for two minutes by the bench mixer to achieve preliminary dispersion.

3. Median of Particle Diameters before Treatment: 16.229 micrometers

4. Test results

| Device tested | Treatment pressure ($kgf/cm^2$) | No. of passes | Median of particle dia. ($\mu m$) |
|---|---|---|---|
| Device of M Corp. | 1500 | 3 | 0.124 |
| Device of N Corp. | 1500 | 3 | 0.225 |
| Device of this invention | 1500 | 3 | 0.060 |

(c) Particle Size Reduction Tests

Sample 1

1. Contents of Sample (1) Calcium carbonate, 25 wt % (43260-0301 manufactured by Junsei Chemical Co., Ltd.)

(2) Trisodiumcitrate, 0.8 wt % (26080-1201 manufactured by Junsei Chemical Co., Ltd.)

(3) Purified water, 74.2 wt % (91308-2163 manufactured by Junsei Chemical Co., Ltd.)

2. Pretreatment Procedure (1) Trisodium citrate was added to purified water.

(2) The mixture obtained in step (1) above was stirred at 1300 r.p.m. by the aforementioned bench mixer to dissolve trisodium citrate.

(3) Calcium carbonate was added to the mixture obtained in step (2) above and a resultant mixture was stirred at 1300 r.p.m. for four minutes by the bench mixer to achieve preliminary dispersion.

3. Median of Particle Diameters before Treatment: 20.329 micrometers

4. Test results

| Device tested | Treatment pressure ($kgf/cm^2$) | No. of passes | Median of particle dia. ($\mu m$) |
|---|---|---|---|
| Device of M Corp. | 1300 | 10 | 0.854 |
| Device of N Corp. | 1300 | 10 | 0.881 |
| Device of this invention | 1300 | 10 | 0.465 |

Sample 2

1. Contents of Sample (1) Aluminum silicate, 20 wt % (29020-1601 manufactured by Junsei Chemical Co., Ltd.)

(2) Sodium hexametaphosphate, 1 wt % (67115-0401 manufactured by Junsei Chemical Co., Ltd.)

(3) Purified water, 79 wt % (91308-2163 manufactured by Junsei Chemical Co., Ltd.)

2. Pretreatment Procedure (1) Sodium hexametaphosphate was added to purified water.

(2) The mixture obtained in step (1) above was stirred at 1500 r.p.m. by the aforementioned bench mixer to dissolve sodium hexametaphosphate.

(3) Aluminum silicate was added to the mixture obtained in step (2) above and a resultant mixture was stirred at 1800 r.p.m. for five minutes by the bench mixer to achieve preliminary dispersion.

3. Median of Particle Diameters before Treatment: 5.127 micrometers

| | 4. Test results | | |
|---|---|---|---|
| Device tested | Treatment pressure (kgf/cm$^2$) | No. of passes | Median of particle dia. ($\mu$m) |
| Device of M Corp. | 1500 | 5 | 3.005 |
| Device of N Corp. | 1500 | 5 | 3.541 |
| Device of this invention | 1500 | 5 | 1.997 |

The test results presented above prove that the fine particle producing device 8 according to the first embodiment of the invention could provide a higher particle size reducing effect than the conventional devices in any of the emulsification, dispersion and particle size reduction tests. Upon completing the emulsification tests, which were carried out in succession with two samples mentioned above, the fine particle producing device 8 was left in a non-operating state for a specified period of time, and then disassembled for abrasion inspection of the individual blocks 10–12. No significant abrasion or wear was found in any block, proving the ability of the fine particle producing device 8 to provide stable particle size reducing performance.

Figure 4:
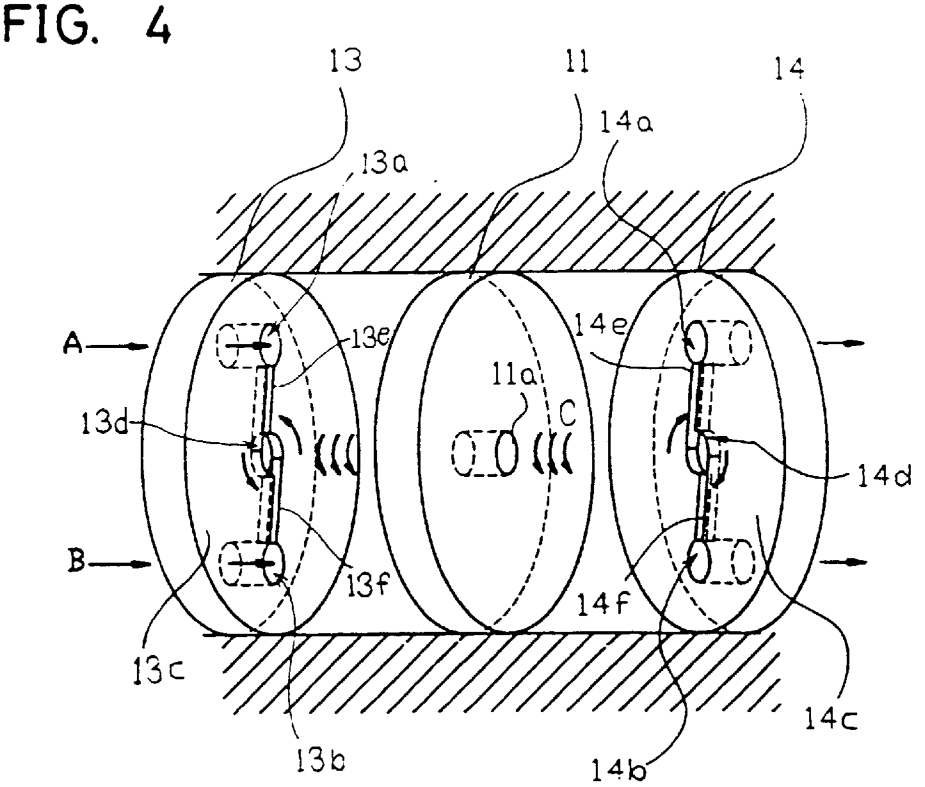
FIG. 4 is an exploded view of a fine particle producing device according to another variation of the first embodiment.
Figure 5:
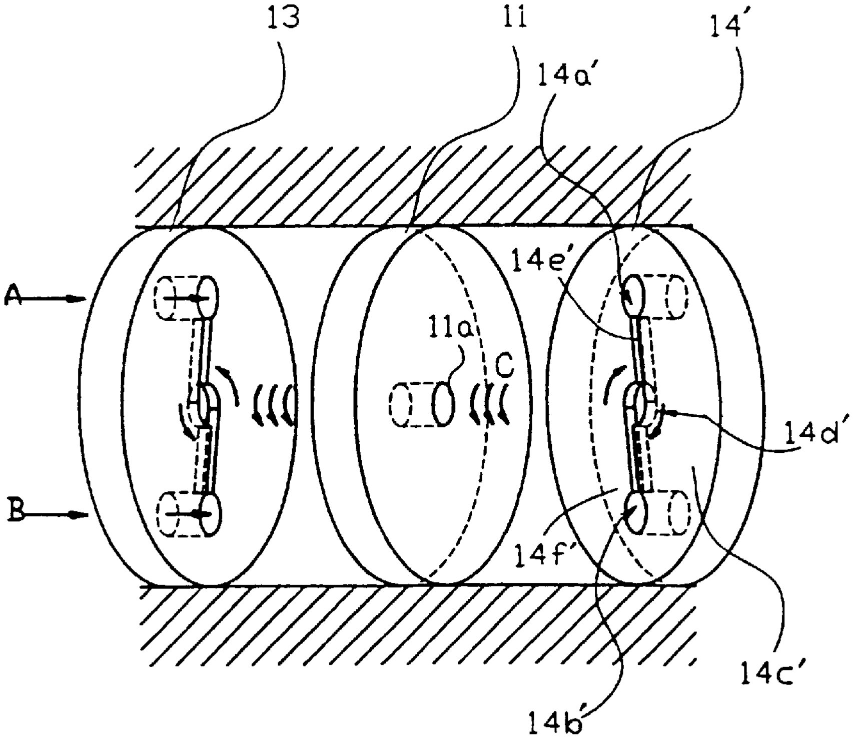
FIG. 5 is an exploded view of a fine particle producing device according to still another variation of the first embodiment.

FIGS. 4 and 5 show variations of the aforementioned fine particle producing device 8. In the following discussion of these variations, constituent elements equivalent to those shown in FIG. 2 are designated by the same reference numerals and a description of such elements is omitted.

A fluid inflow block 13 shown in FIG. 4 has a pair of through holes 13*a*, 13*b* formed at the same distance from the center of the fluid inflow block 13, and a turbulence pocket 13*d* forming a closed-bottom cylindrical hole is made at a central portion of a downstream side 13*c* of the fluid inflow block 13. Groove-like straight channels 13*e* and 13*f* are formed in the fluid inflow block 13 that extend out from the circumference of the turbulence pocket 13*d* in its opposite tangential directions and connect to downstream openings of the through holes 13*a* and 13*b*, respectively. The fluid inflow block 13 thus constructed can produce a spirally whirling turbulent flow C similar to the one described with reference to FIG. 2. In FIG. 4, a fluid outflow block 14 placed downstream of an intermediate block 11 has a pair of through holes 14*a*, 14*b* and groove-like straight channels 14*e* and 14*f* formed in rotationally symmetrical positions with respect to the groove-like straight channels 13*e* and 13*f*. Designated by the numeral 14*d* is a turbulence pocket formed in an upstream side 14*c* of the fluid inflow block 14.

In the variation of the first embodiment shown in FIG. 5, groove-like straight channels 14*e*' and 14*f*' made in a fluid inflow block 14' form an opposite spiral pattern as compared to the groove-like straight channels 14*e* and 14*f* of the fluid inflow block 14 of FIG. 4. The fluid inflow block 14' of FIG. 5 has the capability to decrease the rotational energy of the fluid flow to a greater extent than the fluid inflow block 14 of FIG. 4.

Although the blocks 10, 12, 13, 14 have a disklike shape in the aforementioned first embodiment and its variations, the blocks may be formed into other shapes, such as a rectangle or a hexagon.

Figure 6A:
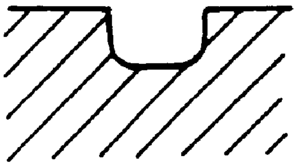
FIGS. 6A and 6B are diagrams showing preferred cross-sectional shapes of groove-like channels formed in each block.
Figure 6B:
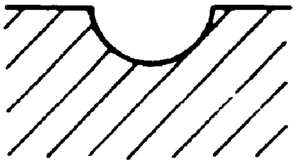

Preferably, each groove-like channel is rounded along its bottom corners as shown in FIG. 6A or formed into a semicircular sectional shape as shown in FIG. 6B. The groove-like channel having such cross-sectional shape would provide a large flow coefficient.

Although the individual blocks 10–14 have the same thickness in the aforementioned first embodiment and its variations, the thickness of the block 11 may be increased, for instance, to create an elongated turbulent flow passage 11*a* and thereby adjust the particle size reducing effect.

Although the curved channels 10*e*, 10*f* and the turbulence pocket 10*d* are formed on the downstream side 10*c* of the fluid inflow block 10 while the curved channels 12*e*, 12*f* and the turbulence pocket 12*d* are formed on the upstream side 12*c* of the fluid outflow block 12 in the aforementioned first embodiment, similar curved channels and turbulence pockets may also be formed on upstream and/or downstream sides of the intermediate block 11.

FINE PARTICLE PRODUCING DEVICE ACCORDING TO THE SECOND EMBODIMENT

Figure 7:
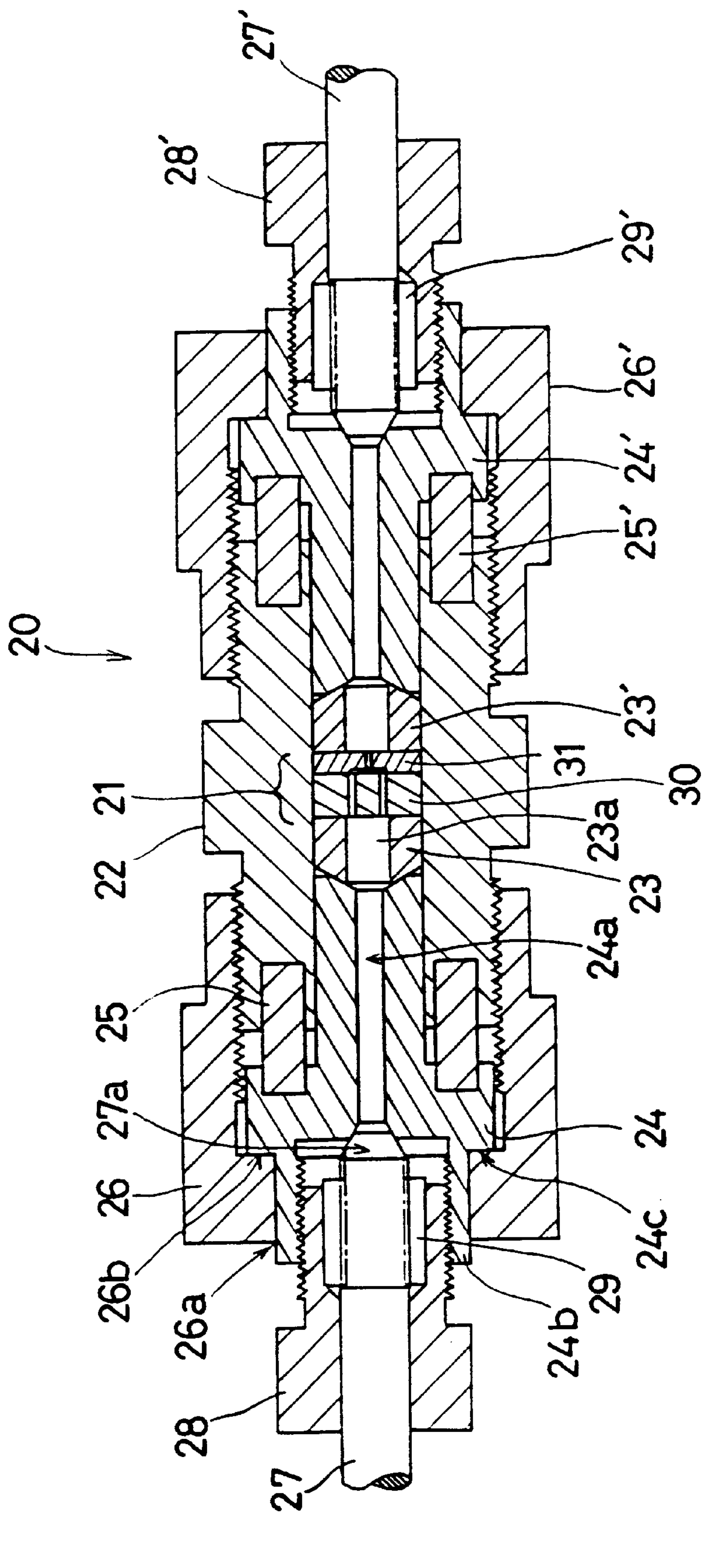
FIG. 7 is a vertical cross-sectional view of a fine particle producing device according to a second embodiment of the invention.

FIG. 7 is a vertical cross-sectional view of the fine particle producing device 20 according to the second embodiment of the invention. The fine particle producing device 20 of FIG. 7 comprises a cylindrical sealed casing 22 and a particle size reducing block pair 21 which is fitted in the sealed casing 22. A cylindrical bushing 23 which presses against an upstream end of the block pair 21 and a retainer 24 having a stepped cylindrical shape are mounted at an upstream end of the sealed casing 22 on a common axis, with a plurality of pins 25 bridging the sealed casing 22 and the retainer 24 to prevent them from rotating relative to each other.

Through holes 23*a* and 24*a* are made in the bushing 23 and the retainer 24, respectively, along their common central axis, and these through holes 23*a* and 24*a* connect to an inflow opening of the particle size reducing block pair 21. The sealed casing 22 is externally threaded at its end portion where the retainer 24 is fitted, and a cap nut 26 is fitted over this externally threaded portion.

As shown in FIG. 7, a sleeve portion 24*b* of the retainer 24 is fitted into an unthreaded opening 26*a* of the cap nut 26. An annular flange 24*c* of the retainer 24 comes in contact with the inside of a cap portion 26*b* of the cap nut 26 that surrounds the opening 26*a*. With this arrangement, the retainer 24 is forced against the upstream end of the sealed casing 22 when the cap nut 26 is tightened, and the retainer 24 and the bushing 23 are pressed together tightly against the upstream end of the block pair 21.

The sleeve portion 24*b* of the retainer 24 is internally threaded. A high-pressure pipe 27 is connected to the through hole 24*a*of the retainer 24 by tightening an externally threaded gland 28, which is fitted on an end 27*a* of the high-pressure pipe 27, into the sleeve portion 24*b*. The high-pressure pipe 27, the retainer 24 and the bushing 23 thus joined form together an inflow channel of the particle size reducing block pair 21.

A downstream half of the sealed casing 22 has a mirror image configuration of its upstream half. Specifically, the downstream half of the sealed casing 22 is fitted with a bushing 23', a retainer 24', pins 25', a cap nut 26', a high-pressure pipe 27' and a gland 28' having substantially the same constructions as their counterparts on the upstream half of the sealed casing 22. The bushing 23', the retainer 24' and the high-pressure pipe 27' form together an outflow passage of the particle size reducing block pair 21. Designated by the numerals 29 and 29' in FIG. 7 are sleeves which are fitted over joint ends of the high-pressure pipe 27, 27'.

Figure 8A:
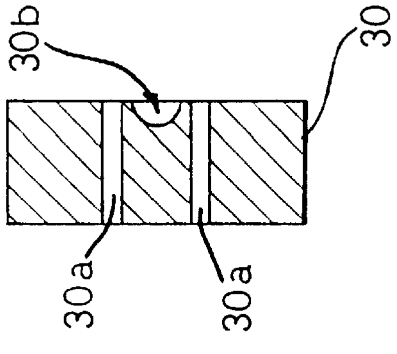
FIGS. 8A, 8A'8B and 8B' are diagrams depicting the construction of a block pair shown in FIG. 7.
Figure 8A:
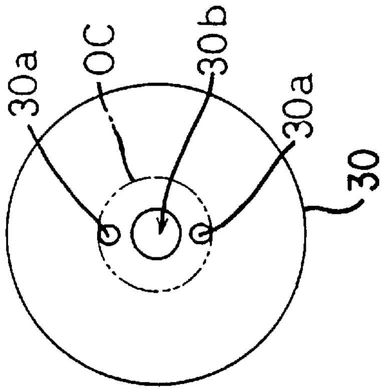
Figure 8B:
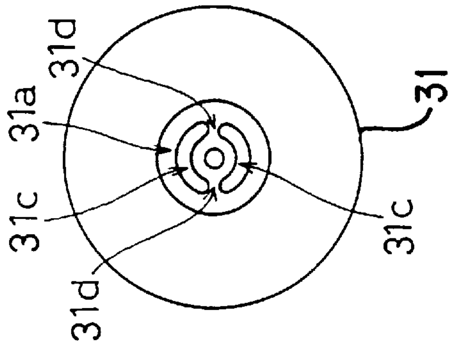
Figure 8B:
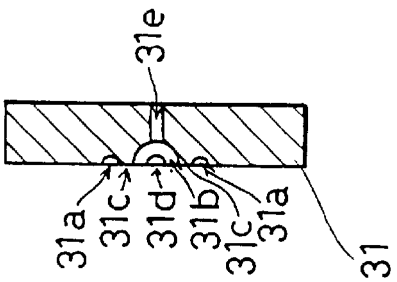

Referring now to FIGS. 8A and 8B, the construction of the block pair 21 is described in detail. The block pair 21 comprises a disklike first block 30 and a disklike second block 31. FIG. 8A shows a sectional front view and FIG. 8A' a right side view of the first block 30 while FIG. 8B shows a left side view and FIG. 8B' a sectional front view of the second block 31.

The first block 30 has a pair of through holes 30*a* formed parallel to and at the same distance from its central axis as shown in FIG. 8A. Further, the first block 30 has a hemispherical turbulence pocket 30*b* formed at the center of its downstream side.

The second block 31 has the same diameter as the first block 30. A circular channel 31*a* is formed in an upstream side of the second block 31 that comes in close contact with the first block 30, the outer circumference of the circular channel 31*a* matching a circle OC circumscribed about the pair of through holes 30*a* in the first block 30. The second block 31 also has a hemispherical turbulence pocket 31*b* formed at the center of its upstream side. The circular channel 31*a* and the turbulence pocket 31*b* are separated from each other by a pair of arc-shaped walls 31*c*, and gaps 31*d* between the arc-shaped walls 31*c* form a pair of fluid squirting openings. Both ends of each wall 31*c* are rounded to reduce fluid resistance. Further, a through hole 31*e* is formed at the bottom of the turbulence pocket 31*b*. One advantage of this disklike structure of the second block 31 having the rounded walls 31*c* is the ease of machining.

Operation of the fine particle producing device 20 is now described with reference to FIGS. 8A, 8A', 8B, 8B' and 9. When a fluid mixture to be treated is introduced into the sealed casing 22 through the high-pressure pipe 27, the retainer 24 and bushing 23, it is separated into two streams F1 and F2 which flow through the pair of through holes 30*a* in the first block 30. These two streams F1 and F2 are accelerated in the through holes 30*a* and enter the circular channel 31*a* formed in the second block 31.

The streams F1 and F2 individually branch out in opposite directions in the circular channel 31*a* and advance along its walls 31*c*, whereby high-speed streams F1' and F2' are produced. These high-speed streams F1' and F2' meet near the two gaps 31*d* between the walls 31*c* from opposite directions. As a consequence, combined streams flow through the gaps 31*d* into the turbulence pocket 31*b*, spreading in fanlike form, and collide with each other. These colliding high-speed streams create a spirally rotating turbulent flow in the turbulence pocket 31*b* that is sent downstream through the through hole 31*e*.

FIGS. 10A and 10B illustrate a second block 31 in one variation of the second embodiment, in which a turbulence pocket 31*f* is formed of a shallow cylindrical recess instead of the hemispherical hollow. In the following discussion, constituent elements equivalent to those shown in FIGS. 8A and 8B are designated by the same reference numerals and a description of such elements is omitted.

Figure 11:
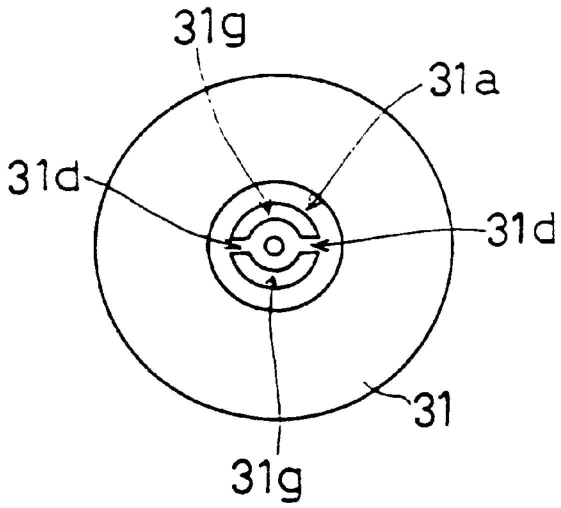
FIG. 11 is a diagram showing a second block having modified walls according to another variation of the second embodiment.
Figure 12:
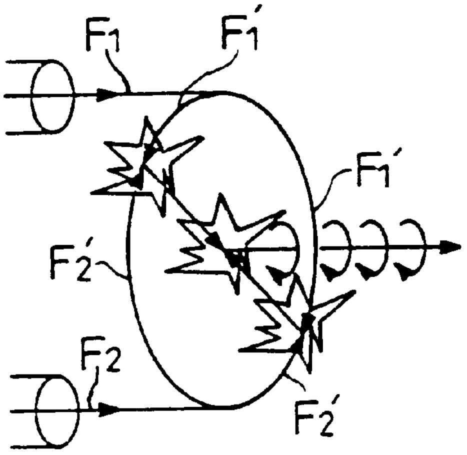
FIG. 12 is a schematic diagram illustrating fluid flows produced by the second block of FIG. 11.

FIG. 11 illustrates a second block 31 having modified walls 31*g* in another variation of the second embodiment, in which both ends of each wall 31*g* are cut straight across, forming grooves having semicircular or rectangular cross sections. In this variation, high-speed streams F1' and F2' collide near a pair of gaps 31*d* between the walls 31*g* where they meet with each other and combined streams squirted through the gaps 31*d* collide again as shown in FIG. 12. As will be understood from the above description, the walls 31*g* cut straight across at both ends produce turbulence and a shearing force in the fluid mixture to be treated, thereby providing an enhanced particle size reducing effect.

Figure 13:
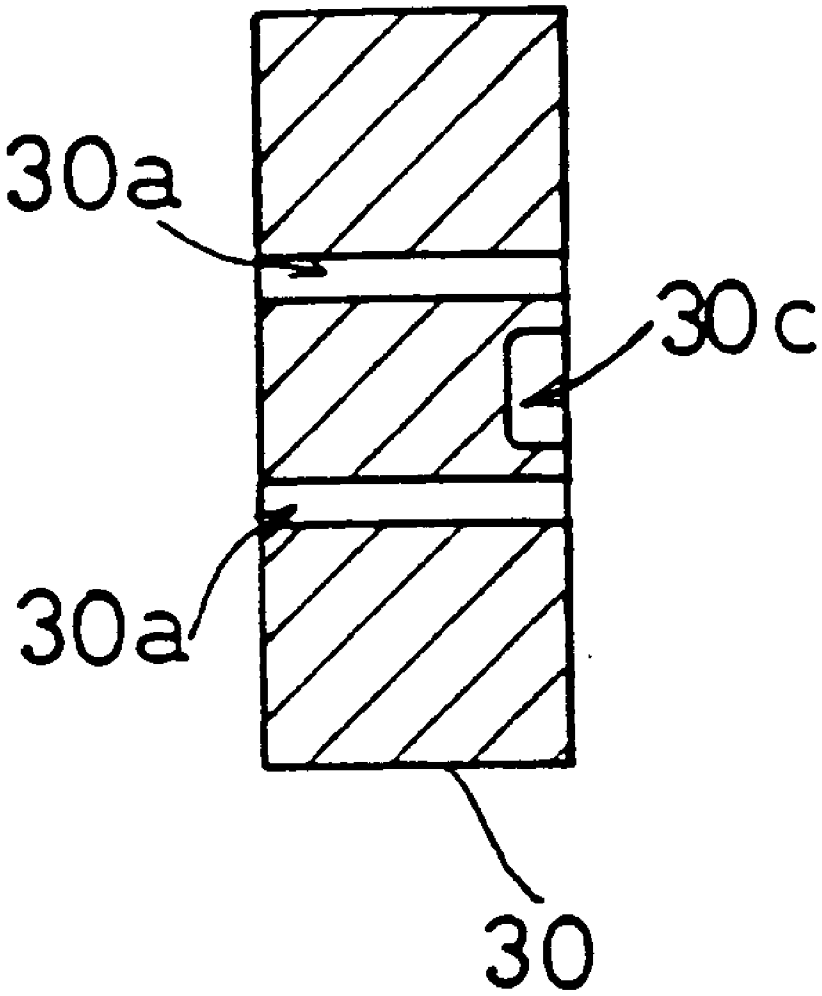
FIG. 13 is a diagram showing a first block according to still another variation of the second embodiment.

FIG. 13 illustrates a first block 30 in still another variation of the second embodiment, in which a turbulence pocket is formed of a recess 30*c* having a generally flat, circular bottom instead of the hemispherical hollow.

Results of evaluation tests carried out by using the aforementioned fine particle producing device 20 are described below. Results of tests conducted under the same test conditions by using a mixer (manufactured by Nippon Seiki Seisakusho Co., Ltd.) and a conventional fine particle producing device (manufactured by N Corp.) are also presented to provide comparative examples. The conventional fine particle producing device is constructed such that fluid streams are caused to collide with each other at a joint of straight flow channels which are connected together with a 90-degree phase difference. The measuring equipment and evaluation method used for the testing were the same as used for evaluating the device of the first embodiment.

(a) Emulsification Tests

1. Contents of Sample (1) Soybean oil, 10 wt % (manufactured by Kanto Chemical Co., Ltd.)

(2) Lecithin derived from soybean, 0.5 wt % (manufactured by Kanto Chemical Co., Ltd.)

(3) Purified water, 89.5 wt %

2. Pretreatment Procedure (1) A specified amount of soybean lecithin was added to a specified amount of soybean oil and the soybean lecithin was dissolved in the soybean oil.

(2) The mixture obtained in step (1) above was added to a specified amount of purified water and a resultant mixture was stirred for one minute by using a bench mixer (Model AM-9 manufactured by Nippon Seiki Seisakusho Co., Ltd.) which was set to 5000 r.p.m. to achieve preliminary emulsification.

(3) Median of particle diameters after preliminary emulsification: 26.72 micrometers (b) Dispersion and Particle Size Reduction Tests 1. Contents of Sample (1) Zinc oxide, 30 wt % (fine particle zinc oxide manufactured by Hakusui Chemical Industry Co., Ltd.)

(2) Demole EP, 2 wt % (manufactured by Kao Corporation)

(3) Purified water, 68 wt %

2. Pretreatment Procedure (1) Demole EP was added to a specified amount of purified water and dissolved therein.

(2) Zinc oxide was added to the mixture obtained in step (1) above and a resultant mixture was stirred for five minutes by the aforementioned bench mixer which was now set to 15000 r.p.m. to achieve preliminary dispersion.

(3) Median of particle diameters after preliminary dispersion: 0.69 micrometers.

| Device tested | Treatment conditions | Particle size distribution Median dia. ($\mu$m) | Particle size distribution 10%/90% dia. ($\mu$m) |
|---|---|---|---|
| Device of | 100 kgf/cm$^2$ - 1 pass | 1.02 | 0.53/2.6 |
| This | 100 kgf/cm$^2$ - 3 passes | 0.96 | 0.49/2.15 |
| Invention | 100 kgf/cm$^2$ - 5 passes | 0.88 | 0.46/2.02 |
| Device of | 300 kgf/cm$^2$ - 1 pass | 0.81 | 0.48/2.01 |
| This | 300 kgf/cm$^2$ - 3 passes | 0.52 | 0.14/1.08 |
| Invention | 300 kgf/cm$^2$ - 5 passes | 0.35 | 0.11/0.69 |
| Device of | 600 kgf/cm$^2$ - 1 pass | 0.55 | 0.30/1.39 |
| This | 600 kgf/cm$^2$ - 3 passes | 0.21 | 0.09/0.65 |
| Invention | 600 kgf/cm$^2$ - 5 passes | 0.15 | 0.07/0.23 |
| Device of | 800 kgf/cm$^2$ - 1 pass | 0.41 | 0.23/0.97 |
| This | 800 kgf/cm$^2$ - 3 passes | 0.16 | 0.07/0.46 |

-continued

| Device tested | Treatment conditions | Particle size distribution Median dia. (μm) | Particle size distribution 10%/90% dia. (μm) |
|---|---|---|---|
| Invention | 800 kgf/cm² - 5 passes | 0.07 | 0.03/0.15 |
| Device of | 1200 kgf/cm² - 1 pass | 0.30 | 0.14/0.87 |
| This | 1200 kgf/cm² - 3 passes | 0.15 | 0.04/0.43 |
| Invention | 1200 kgf/cm² - 5 passes | 0.05 | 0.03/0.12 |
| Mixer | 5000 r.p.m. - 5 min. | 1.84 | 0.64/28.09 |
| | 5000 r.p.m. - 10 min. | 1.30 | 0.62/10.14 |
| | 5000 r.p.m. - 20 min. | 1.21 | 0.59/4.65 |
| | 5000 r.p.m. - 30 min. | 1.19 | 0.57/4.32 |
| Device of | 1200 kgf/cm² - 1 pass | 0.43 | 0.22/0.99 |
| N Corp. | 1200 kgf/cm² - 3 passes | 0.31 | 0.16/0.67 |
| | 1200 kgf/cm² - 5 passes | 0.18 | 0.10/0.36 |

The emulsification test results presented above prove that the fine particle producing device 20 could provide an enhanced particle size reducing effect and produce fine particles of uniform size with a small range of particle size distribution, compared to the conventional mixer and fine particle producing device.

Dispersion and Particle Size Reduction Test Results

| Device tested | Treatment conditions | Particle size distribution Median dia. (μm) | Particle size distribution 10%/90% dia. (μm) |
|---|---|---|---|
| Device of This invention | 600 kgf/cm² - 3 passes | 0.29 | 0.11/0.68 |
| | 600 kgf/cm² - 5 passes | 0.19 | 0.10/0.29 |
| Device of This invention | 800 kgf/cm² - 3 passes | 0.21 | 0.14/0.47 |
| | 800 kgf/cm² - 5 passes | 0.12 | 0.08/0.47 |
| Device of This invention | 1200 kgf/cm² - 3 passes | 0.19 | 0.10/0.22 |
| | 1200 kgf/cm² - 5 passes | 0.08 | 0.05/0.13 |
| Mixer | 15000 r.p.m. - 15 min. | 0.41 | 0.11/1.12 |
| | 15000 r.p.m. - 30 min. | 0.39 | 0.11/1.09 |
| Device of | 1200 kgf/cm² - 3 passes | 0.36 | 0.11/0.62 |
| N Corp. | 1200 kgf/cm² - 5 passes | 0.21 | 0.07/0.39 |

The dispersion and particle size reduction test results presented above prove that the fine particle producing device 20 could provide an enhanced particle size reducing effect and produce fine particles of uniform size with a small range of particle size distribution, compared to the conventional mixer and fine particle producing device.

It is recognized from the foregoing discussion that the fine particle producing device 20 according to the second embodiment of the invention can achieve a higher particle size reducing effect than the conventional devices in any of the emulsification, dispersion and particle size reduction tests.

FINE PARTICLE PRODUCING SYSTEM ACCORDING TO THE THIRD EMBODIMENT

The fine particle producing system according to the third embodiment of the invention is now described. This system is constructed by adding the pretreatment unit 40 between the high-pressure pump 7 and the fine particle producing device 8 shown in FIG. 1.

Figure 14:
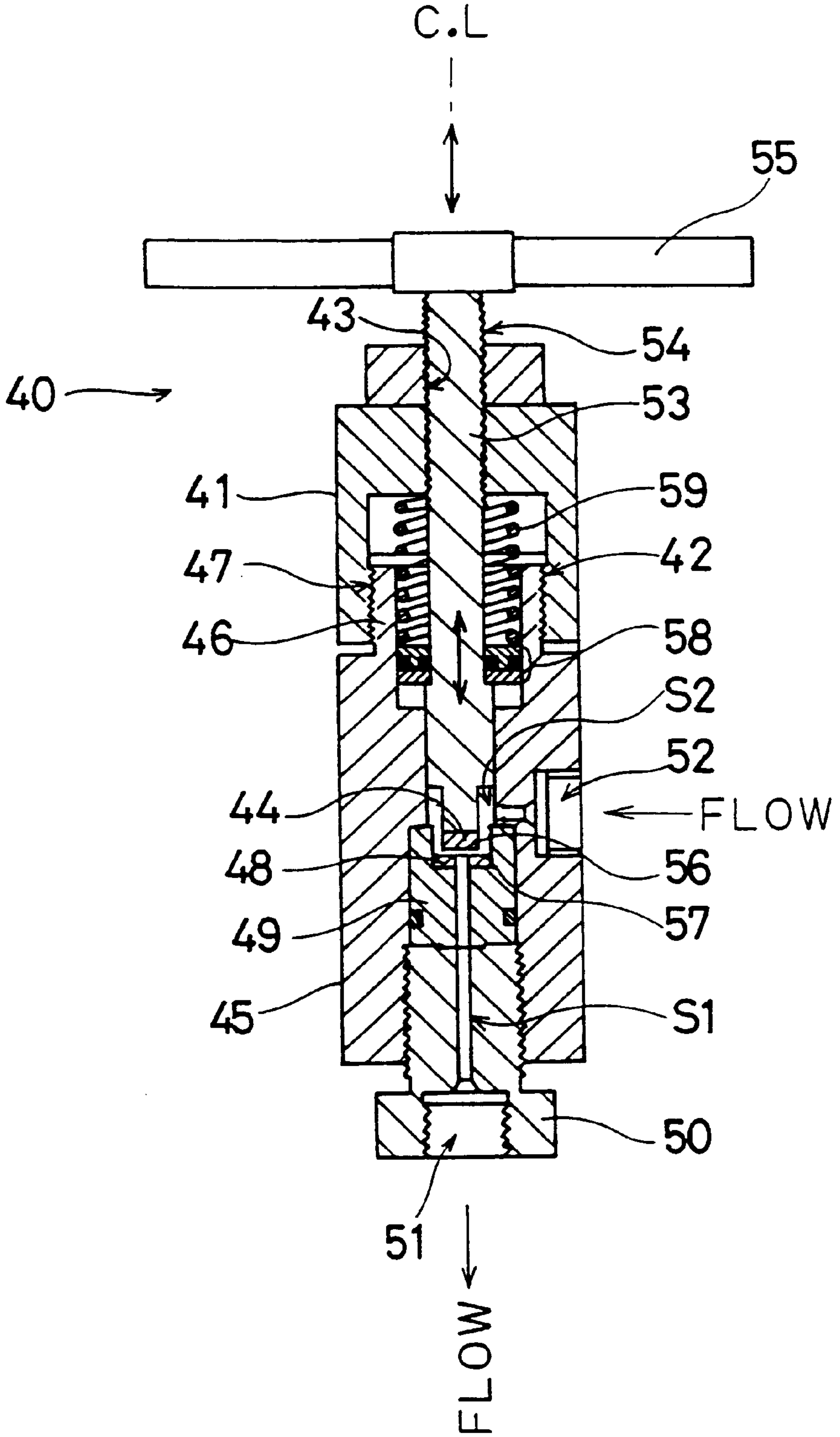
FIG. 14 is a vertical cross-sectional view of a pretreatment unit used in a fine particle producing system according to a third embodiment of the invention.

Referring to FIG. 14, the pretreatment unit 40 comprises an upper cylindrical shell 41 and a lower cylindrical shell 45. An internally threaded portion 42 is formed on an inside surface of the upper cylindrical shell 41 while an externally threaded portion 47 is formed on an outside surface of a small-diameter cylindrical projection 46 which extends upward from the lower cylindrical shell 45. The upper cylindrical shell 41 and the lower cylindrical shell 45 are joined together as the externally threaded portion 47 of the latter is screwed into the internally threaded portion 42 of the former.

The upper cylindrical shell 41 is essentially a cap nut, and a movable shaft 53 is passed through the upper cylindrical shell 41 along its central axis CL. More particularly, an externally threaded portion 54 formed around an upper part of the movable shaft 53 is screwed into an internally threaded portion 43 formed in an upper part of the upper cylindrical shell 41. A seal 58 described below is fitted at a lower part of the movable shaft 53.

Figure 15:
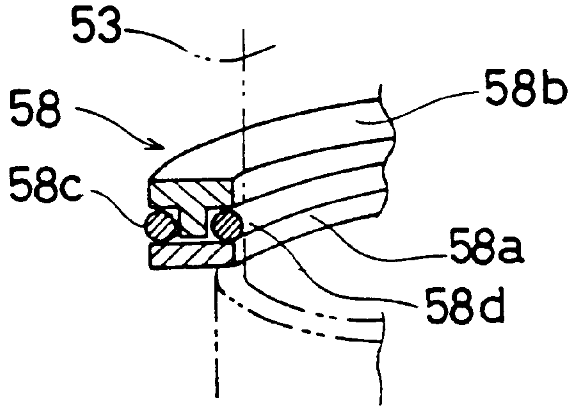
FIG. 15 is a fragmentary perspective view of a seal used in the pretreatment unit shown in FIG. 14.

The seal 58 comprises a lower ringlike backup ring 58*a*, an upper ringlike backup ring 58*b* having a circular ridge projecting downward, and 0-rings 58*c* and 58*d* fitted in outer and inner grooves formed between the backup ring 58*a*, 58*b*, respectively, as shown in FIG. 15. The seal 58 thus configured has an annular shape and is mounted around the movable shaft 53 to seal the gap between an inside surface of the small-diameter cylindrical projection 46 of the lower cylindrical shell 45 and the movable shaft 53 for preventing liquid leakage. A compression coil spring 59 is fitted within the small-diameter cylindrical projection 46 to force the seal 58 downward. Fitted at the top of the movable shaft 53 is a handle 55 which is used for turning the movable shaft 53 by hand. The movable shaft 53 and the handle 55 form together a fluid passage regulating mechanism.

The lower cylindrical shell 45 incorporates a lower circular plate 48 formed of a hard material, such as a ceramic, cemented carbide or diamond. This lower circular plate 48 is placed on a cylindrical support 49 which is secured in position by a gland 50 screwed into the lower cylindrical shell 45. A straight fluid channel S1 passes through the lower circular plate 48, the cylindrical support 49 and the gland 50 along the central axis CL, and the gland 50 has an outflow opening 51 which serves as a receptacle of a pipe joint. There is formed an annular fluid channel S2 between a lower end portion of the movable shaft 53 and an inside surface of the lower cylindrical shell 45.

Figure 16:
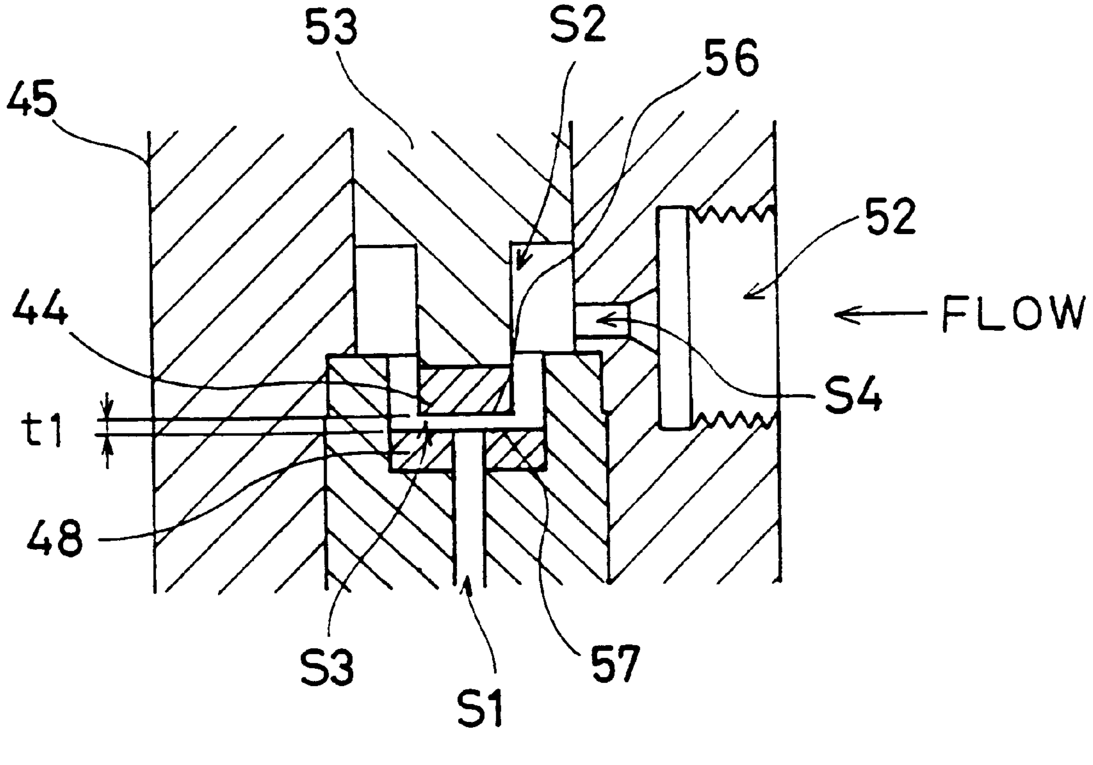
FIG. 16 is an enlarged fragmentary view of a fluid colliding portion of the pretreatment unit.

FIG. 16 is an enlarged fragmentary view illustrating the lower circular plate 48 and its surrounding parts. As shown in FIG. 16, an upper circular plate 44 formed of a hard material, such as a ceramic, cemented carbide or diamond, is fixed to the lower end of the movable shaft 53 by brazing. A movable circular surface 56 of the upper circular plate 44 and a fixed circular surface 57 of the lower circular plate 48 face with each other with a narrow clearance t1 provided between them. In FIG. 16, the numeral S3 designates a fluid colliding channel formed between the two facing circular surfaces 56, 57, the numeral 52 designates an inflow opening which serves as a receptacle of a pipe joint, and the numeral S4 designates a fluid channel which connects the inflow opening 52 to the annular fluid channel S2 and to the fluid colliding channel S3. The inflow opening 52 of the pretreatment unit 40 is connected to a delivery port of the pump 7. The inflow opening 52, the fluid channel S4 and the annular fluid channel S2 form together an inflow passage of the pretreatment unit 40.

Figure 17:
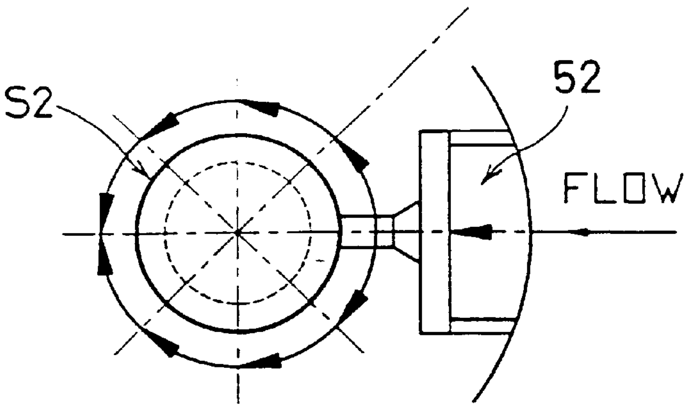
FIG. 17 is a schematic diagram illustrating fluid flows within the pretreatment unit.
Figure 18:
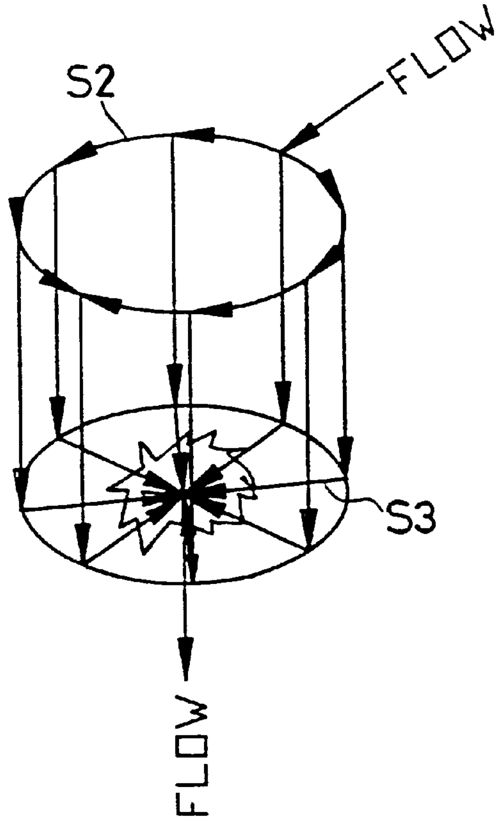
FIG. 18 is a perspective diagram illustrating the fluid flows within the pretreatment unit.

Operation of the pretreatment unit 40 thus constructed is now described with reference to FIGS. 17 and 18, which schematically present fluid flows within the pretreatment unit 40.

A fluid to be treated which is pressurized by the high-pressure pump 7 is introduced into the annular fluid channel S2 through the inflow opening 52 and the fluid channel S4. The fluid flows around the lower end portion of the movable shaft 53 and fills the annular fluid channel S2.

The fluid then flows downward along the annular fluid channel 52 and reaches the periphery of the two facing circular surfaces 56, 57 and enters the fluid colliding channel S3, in which the fluid flows between the upper circular plate 44 and the lower circular plate 48 toward the center of the fluid colliding channel S3. Since the fluid colliding channel S3 has a smaller passage cross section than the annular fluid channel S2, the fluid gains high flow velocity when flowing through the fluid colliding channel S3. F1uid masses flowing at a high velocity from all directions toward the center of the fluid colliding channel S3 collide at a middle part of the upper and lower circular plates 44, 48. Droplets of a substance to be reduced in size contained in the fluid are converted into smaller particles as a result of the collision.

When the handle 55 is rotated, the clearance t1 between the two facing circular surfaces 56 and 57 varies. This causes a change in fluid pressure, whereby the particle size reducing effect can be adjusted. The pretreatment unit 40 is so constructed that the clearance tl between the circular surfaces 56 and 57 can be made larger than the diameter of each droplet of the substance to be reduced in size. Thus, when the fluid colliding channel S3 becomes clogged in pretreatment, the clogging can be removed by making the clearance t1 larger than the droplet diameter, and the clogged substance can be discharged through the outflow opening 51 without dismantling the pretreatment unit 40.

If a variable displacement pump is used as the pump 7 to be connected to the inflow opening 52 of the pretreatment unit 40, it becomes possible to adjust the flow rate of the fluid to be treated. The use of the variable displacement pump 7, combined with the adjustment of the clearance t1 between the circular surfaces 56 and 57, makes it possible to adjust both the flow rate and treatment pressure of the fluid.

If a plurality of pretreatment units 40 are connected in series and the clearance t1 between the circular surfaces 56 and 57 of each successive pretreatment unit 40 is made progressively smaller along the flow of the fluid to be treated, the fluid can be subjected to a multi-stage particle size reducing pretreatment process. In this alternative configuration, it is possible to control the particle size and dispersion status in a more accurate manner. Furthermore, a plurality of passes through the pretreatment process can be performed at one time.

Results of dispersion tests carried out by using the aforementioned fine particle producing system are described below.

(a) Dispersion Tests

1. Contents of Sample (1) Zinc oxide, 60 wt % (fine particle zinc oxide manufactured by Hakusui Chemical Industry Co., Ltd.)

(2) Demole EP, 5 wt % (manufactured by Kao Corporation active agent)

(3) Purified water, 35 wt %

2. Pretreatment Procedure (1) Demole EP was added to a specified amount of purified water and dissolved therein.

(2) Zinc oxide was added to the mixture obtained in step (1) above and a resultant mixture was stirred for ten minutes by a propeller type agitator which was now set to 500 r.p.m. to produce a slurry.

(3) The pretreatment unit was connected to the inflow side of the fine particle producing device and the upstream pressure $P_1$ and the downstream pressure $P_2$ of the pretreatment unit were adjusted to process the slurry produced in step (2) as follows.

$P_1$=1250 kgf/cm$^2$, $P_2$=1200 kgf/cm$^2$ $\Delta P_1 = P_1 - P_2$=50 kgf/cm$^2$ (4) The slurry produced in step (2) was introduced into the pretreatment device, and processed.

Dispersion Test Results

| | Treatment conditions | | Particle size distribution | Particle size distribution |
|---|---|---|---|---|
| Device tested | $\Delta P_1$ [kgf/cm$^2$] | $P_2$ [kgf/cm$^2$] | Median dia. ($\mu$m) | 10%/90% dia. ($\mu$m) |
| No Treatment | | | 121.3 | 10.3/486.2 |
| Pretreatment 1 pass | 50 | 1200 | 1.43 | 0.21/4.02 |
| Pretreatment 3 pass | 50 | 1200 | 0.29 | 0.12/0.57 |
| Pretreatment 5 pass | 50 | 1200 | 1.43 | 0.02/0.15 |
| Fine particle producing device | | 1200 | Impossible | Impossible |

(no treatment recited in the table means the slurry produced in step (2))

As shown in the above dispersion test results, in the case where the slurry having the high concentration was introduced into the fine particle producing device without pretreatment, production of fine particle was impossible because of the facts that the preliminary dispersion produced by the usual agitation had high viscosity due to the high concentration and partly had undispersed particles or aggregates which blocked the passage.

Conventionally, such high concentration slurry has been processed after aggregates are removed from the slurry by a screen. However, the fine particle producing system provided with the pretreatment device can be applied for even slurry having large particle or aggregates without removing aggregates by a screen.

The dispersion test results presented above prove that the pretreatment unit 40 could provide an enhanced particle size reducing effect and produce fine particles of uniform size with a small range of particle size distribution, compared to the conventional mixer and high-pressure homogenizer. It has also been verified that the particle size reducing effect could be controlled if the fluid pressure was altered between 100 kgf/cm$^2$ and 600 kgf/cm$^2$, for instance, by adjusting the clearance t1 between the two facing circular surfaces 56 and 57 of the fluid colliding channel S3.

Although the fluid passage regulating mechanism of this embodiment employs the manually operated handle 55, the fluid passage may be automatically controlled by using a frequency-controlled stepping motor, or remotely controlled by using an electrical or mechanical control system.

Since the fluid colliding channel S3 has a simple physical structure in the pretreatment unit 40 of this embodiment, it is possible to construct the fluid colliding channel S3 with the circular plates 44, 48 formed of such hard materials as a ceramic, cemented carbide or monocrystal diamond. This would serve to improve the durability of the pretreatment unit 40 and reduce its manufacturing costs.

FINE PARTICLE PRODUCING DEVICE ACCORDING TO THE FOURTH EMBODIMENT

Figure 19:
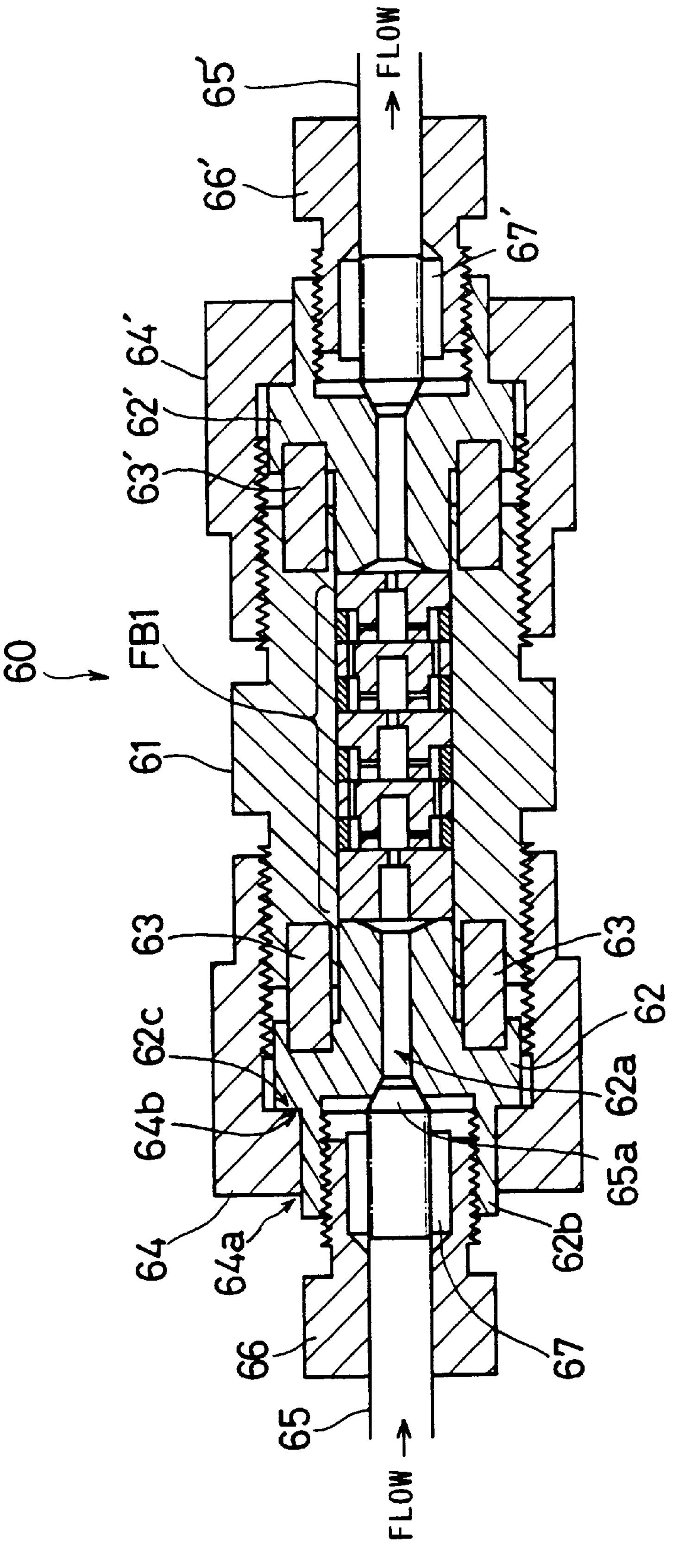
FIG. 19 is a vertical cross-sectional view of a fine particle producing device incorporating a multi-stage particle size reducing block train according to a fourth embodiment of the invention.

FIG. 19 is a vertical cross-sectional view of a fine particle producing device 60 according to a fourth embodiment of the invention incorporating a multi-stage particle size reducing block train FB1, in which fluid masses are caused to collide more than once to provide an increased particle size reducing effect.

Asshownin FIG. 19, the block train FB1 of the fine particle producing device 60 includes a plurality of particle size reducing blocks housed in a cylindrical sealed casing 61. A retainer 62, having a stepped cylindrical shape, which presses against an upstream end of the block train FB1 is mounted at an upstream end of the sealed casing 61, with a plurality of pins 63 bridging the sealed casing 61 and the retainer 62 to prevent them from rotating relative to each other.

A through hole 62*a* is made in the retainer 62 that connects to an inflow opening of the block train FB1. The sealed casing 61 is externally threaded at its end portion where the retainer 62 is fitted, and a cap nut 64 is fitted over this externally threaded portion.

As shown in FIG. 19, a sleeve portion 62*b* of the retainer 62 is fitted into an unthreaded opening 64*a* of the cap nut 64. An annular flange 62*c* of the retainer 62 comes in contact with the inside of a cap portion 64*b* of the cap nut 64 that surrounds the opening 64*a*. With this arrangement, the retainer 62 is forced against the upstream end of the sealed casing 61 when the cap nut 64 is tightened, and the retainer 62 is pressed tightly against the upstream end of the block train FB1.

The sleeve portion 62*b* of the retainer 62 is internally threaded. A high-pressure pipe 65 is connected to the through hole 62*a* of the retainer 62 by tightening an externally threaded gland 66, which is fitted on an end 65*a* of the high-pressure pipe 65, into the sleeve portion 62*b*. The high-pressure pipe 65 and the retainer 62 thus joined form together an inflow channel of the particle size reducing block train FB1.

A downstream half of the sealed casing 61 has a mirror image configuration of its upstream half. Specifically, the downstream half of the sealed casing 61 is fitted with a retainer 62', pins 63', a cap nut 64', a high-pressure pipe 65' and a gland 66' having substantially the same constructions as their counterparts in the upstream half of the sealed casing 61. The retainer 62' and the high-pressure pipe 65' form together an outflow passage of the particle size reducing block train FB1. Designated by the numerals 67 and 67' in FIG. 19 are sleeves which are fitted over joint ends of the high-pressure pipe 65, 65'.

Figure 20:
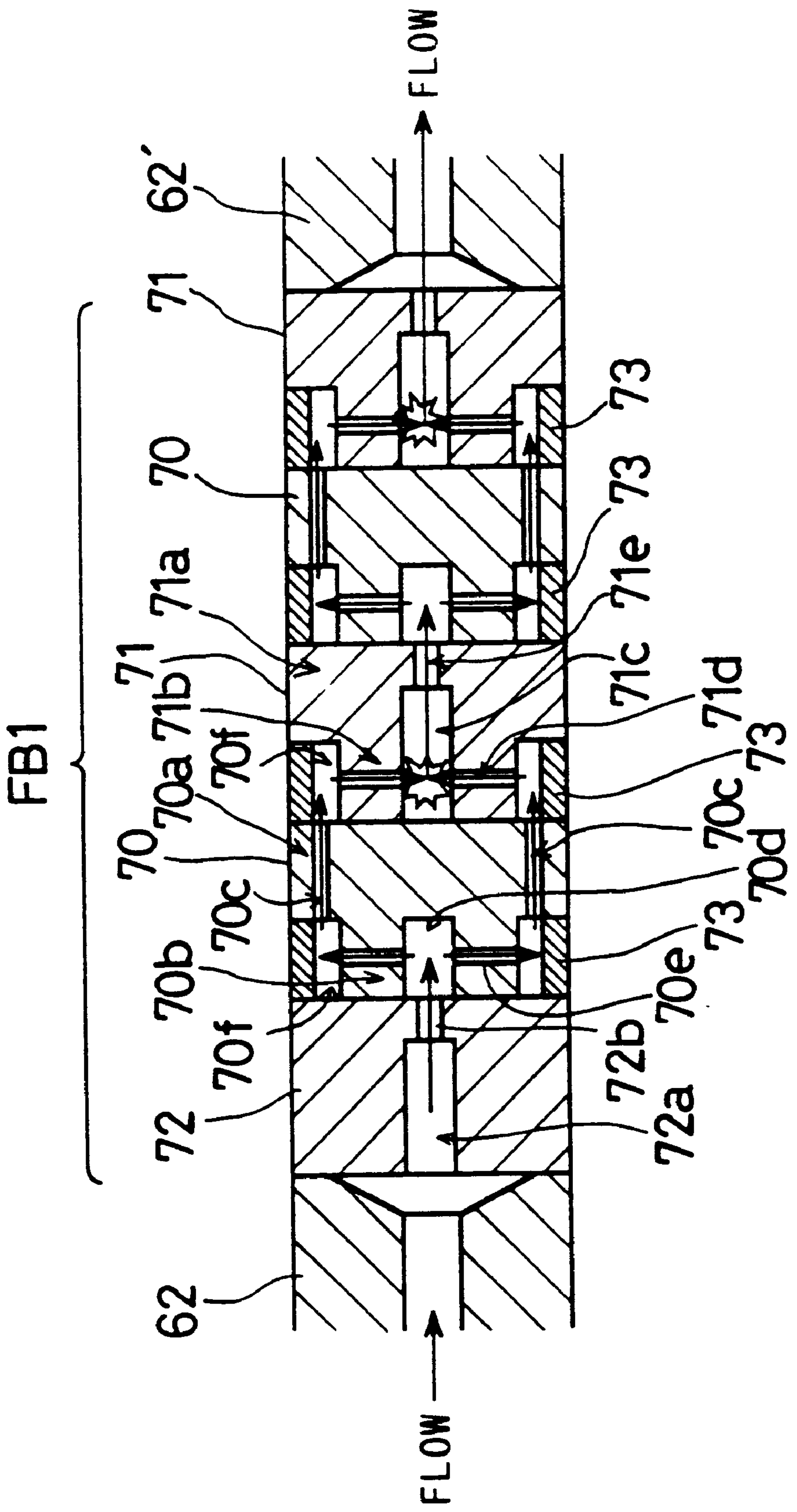
FIG. 20 is an enlarged vertical cross-sectional view of the block train shown in FIG. 19.

Referring now to FIG. 20, the construction of the block train FB1 is described in detail. The block train FB1 comprises a plurality of block pairs which are connected in series, each block pair formed of a first block 70 having fluid branching channels for branching a fluid to be treated into a plurality of high-speed streams and a second block 71 placed in close contact with the first block 70 on its downstream side for causing the high-speed streams of the fluid to join and collide with each other and flow downstream together.

Figure 21:
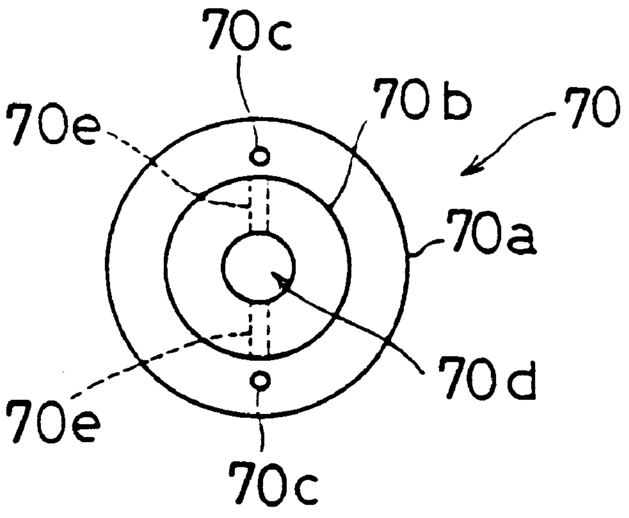
FIG. 21 is a diagram showing a first block of the block train shown in FIG. 20.

Each first block 70 has a disklike flange portion 70*a* and a small-diameter cylindrical projection 70*b* extending from the flange portion 70*a* along its central axis. A pair of through holes 70*c* are formed in the flange portion 70*a* parallel to the central axis of the sealed casing 61. These through holes 70*c* are located at the same distance from and symmetrically with respect to the central axis of the flange portion 70*a*, as shown in FIG. 21. There is formed a fluid pocket 70*d* in the small-diameter cylindrical projection 70*b*. Further, a pair of through holes 70*e* which connect to the fluid pocket 70*d* and serve as the fluid branching channels are formed in the small-diameter cylindrical projection 70*b* in its opposite radial directions.

Figure 22:
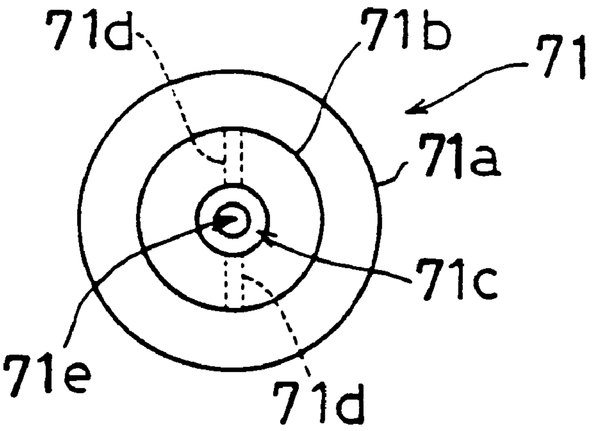
FIG. 22 is a diagram showing a second block of the block train shown in FIG. 20.

Each second block 71 also has a disklike flange portion 71*a* and a small-diameter cylindrical projection 71*b* extending from the flange portion 71*a* along its central axis. The flange portion 71*a* has the same outside diameter as the flange portion 70*a* while the small-diameter cylindrical projection 71*b* has the same outside and inside diameters as the small-diameter cylindrical projection 70*b*. There is formed a turbulence pocket 71*c* in the small-diameter cylindrical projection 71*b*. A pair of through holes 71*d* which connect to the turbulence pocket 71*c* and serve as fluid colliding channels are formed in the small-diameter cylindrical projection 71*b* in its opposite radial directions, as shown in FIG. 22. Further, a through hole 71*e* for transmitting fluid masses downstream after collision is formed in the flange portion 71*a* along its central axis.

There is placed a front-end block 72 in close contact with the first block 70 mounted in an upstream stage of the block train FB1. A deep hole 72*a* having a relatively larger diameter and a smaller through hole 72*b* connecting the deep hole 72*a* to the fluid pocket 70*d* are formed in the front-end block 72 along its central axis. In this arrangement, the downstream end surface of the front-end block 72 serves as a front wall of the fluid pocket 70*d* of the first block 70 in the upstream stage of the block train FB1.

One each ring-shaped seal 73 is fitted between the front-end block 72 and the adjacent first block 70 and between the first block 70 and the adjacent second block 71 to join the individual blocks 72, 70, 71 together and prevent liquid leakage from their fluid channels. A flow buffering space 70*f* is formed between the small-diameter cylindrical projection 70*b* of each first block 70 and the seal 73 mounted around the small-diameter cylindrical projection 70*b*. The flow buffering space 70*f* temporarily holds fluid masses squirted at a high velocity from the through holes 70*e* and stabilizes the fluid flow.

While each of the first blocks 70 has a pair of through holes 70*e* in this embodiment, there may be formed more than two through holes 70*e*. Similarly, there may be made more than two through holes 71*d* in each of the second blocks 71. In these cases, the individual through holes 70*e*, 71*d* should preferably be arranged in a radial configuration. Although the above-described block train FB1 fitted in the sealed casing 61 is formed of two combinations of the first and second blocks 70, 71, the fine particle producing device 60 may be modified to comprise three or more combinations of the first and second blocks 70, 71.

Operation of the fine particle producing device 60 thus constructed is now described. A high-pressure fluid to be treated is introduced into the sealed casing 61 through the high-pressure pipe 65 and the retainer 62. The fluid passes through the deep hole 72*a* and the through hole 72*b* of the front-end block 72 and flows into the fluid pocket 70*d* of the first block 70 of the upstream stage, where the fluid flow is blocked by a bottom surface of the fluid pocket 70*d*. A turbulent flow is produced in the fluid pocket 70*d* when the fluid is directed to the through holes 70*e* in the first block 70.

When the fluid to be treated is separated into a pair of streams which flow through the through holes 70*e* at a high speed. These high-speed streams directed outward in opposite radial directions of the sealed casing 61 flow into the first flow buffering space 70*f* formed between the small-diameter cylindrical projection 70*b* of the first block 70 of the upstream stage and the seal 73 mounted around the small-diameter cylindrical projection 70*b*.

The fluid slightly depressurized, and stabilized, in the flow buffering space 70*f* flows downstream through the through holes 70*c* in the first block 70, forming again a pair of high-speed streams. Now, these high-speed streams flow into the next flow buffering space 70*f* formed between the small-diameter cylindrical projection 71*b* of the second block 71 of the upstream stage and the seal 73 mounted around the small-diameter cylindrical projection 71*b*.

The fluid then flows into the two through holes 71*d* in the second block 71, forming a pair of high-speed streams directed to each other. These high-speed streams enter the turbulence pocket 71*c* and collide with each other therein. Subsequently, the fluid flows through the first block 70 and the second block 71 in a downstream stage of the block train FB1 in the same manner as described above, making successive 90-degree turns and sequentially producing a turbulent flow, high-speed streams, a collision and a turbulent flow again. Droplets of a substance to be reduced in size contained in the fluid are converted into fine particles during this process. It is possible to achieve a remarkably high particle size reducing effect as the high-speed streams of the fluid collide with each other more than once in the sealed casing 61.

Figure 23:
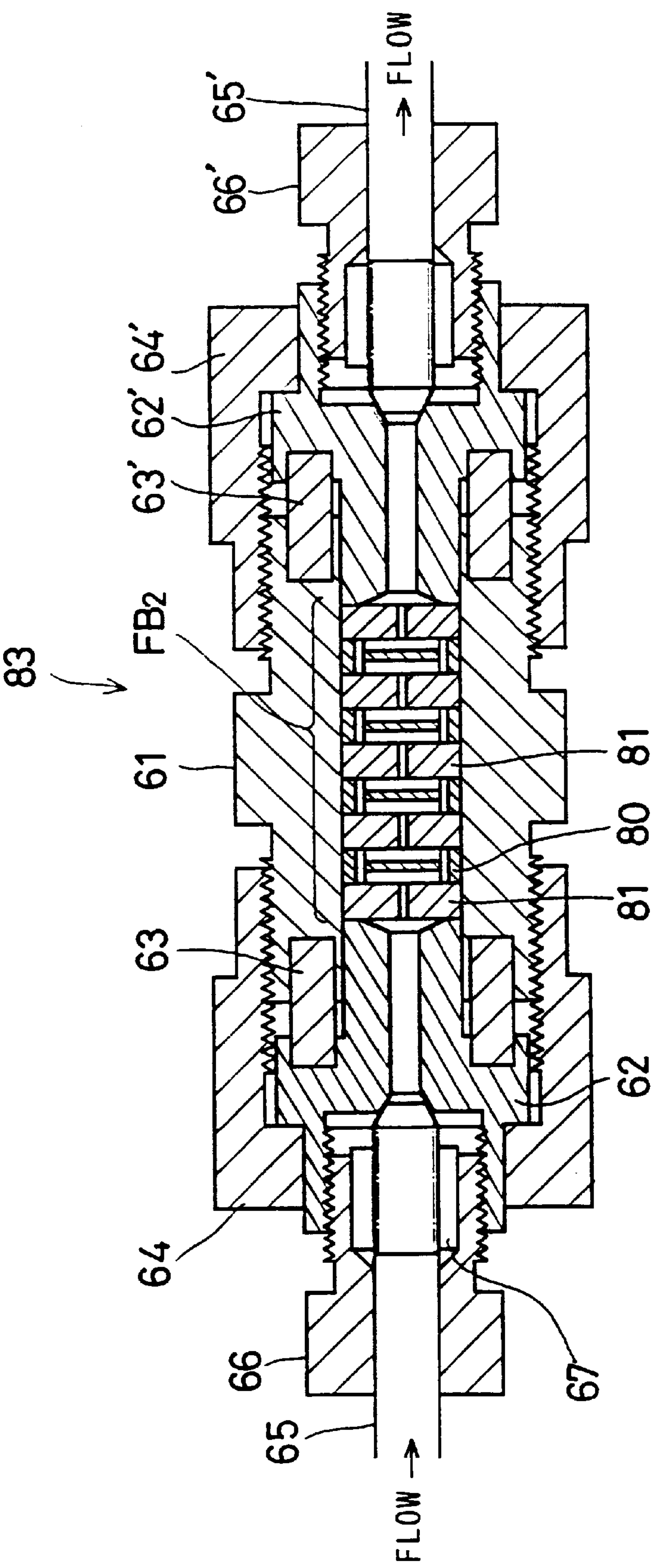
FIG. 23 is a vertical cross-sectional view of a fine particle producing device incorporating a multi-stage particle size reducing block train according to a variation of the fourth embodiment.

FIG. 23 is a diagram showing a fine particle producing device 83 incorporating a multi-stage particle size reducing blocktrain FB2 according to a variation of the fourth embodiment. The fine particle producing device 83 is identical to the fine particle producing device 60 of FIG. 19 except for the block train FB2. Accordingly, constituent elements equivalent to those shown in FIG. 19 are designated by the same reference numerals and a description of such elements is omitted in the following discussion.

The block train FB2 comprises a plurality of blocks 80, each having a groove-like fluid branching channel 80*c* and a groove-like fluid colliding channel 80*d*, and a plurality of partitioning blocks 81 placed on both sides of each block 80. Each partitioning block 81 has a through hole 81*a* passing along its central axis which would serve as a fluid inlet for a block 80 located on a downstream side and as a fluid outlet for a block 80 located on an upstream side.

Figure 24:
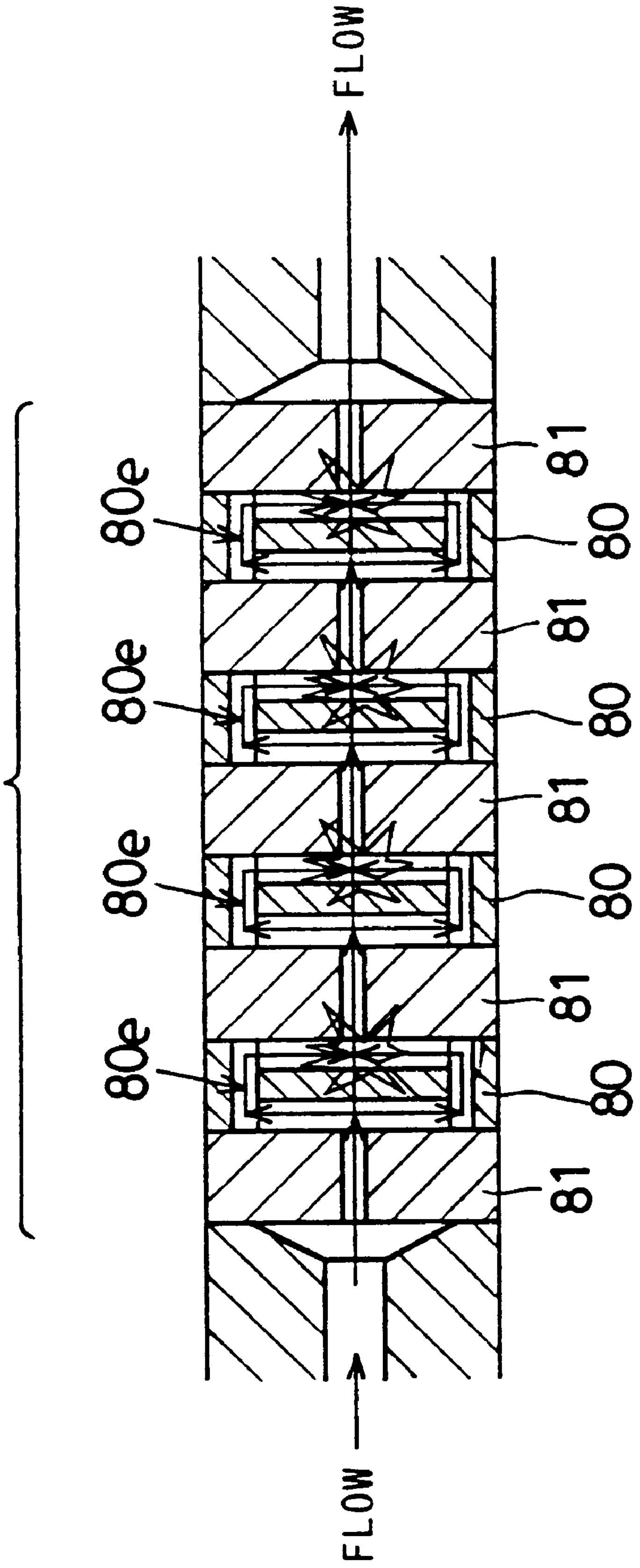
FIG. 24 is an enlarged vertical cross-sectional view of the block train shown in FIG. 23.
Figure 25:
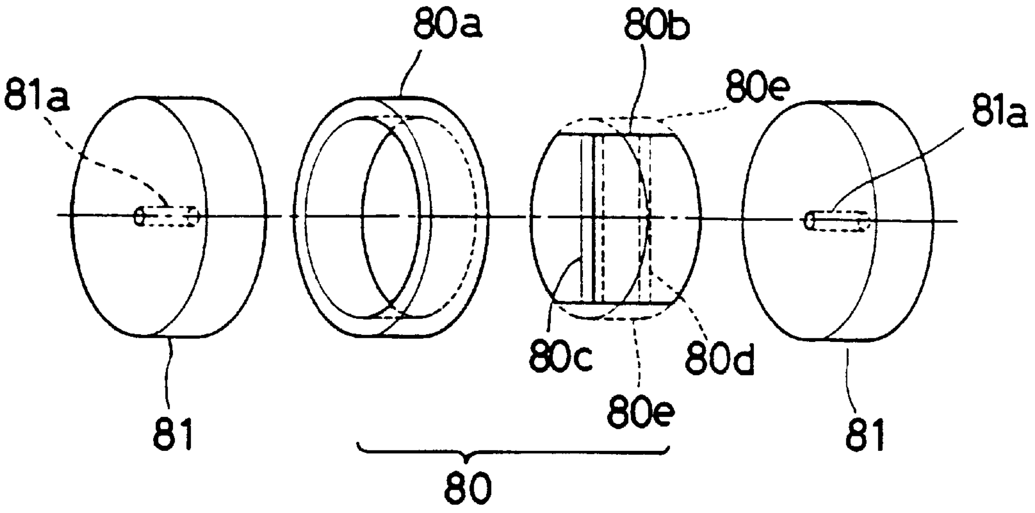
FIG. 25 is an exploded view of individual blocks of the block train shown in FIG. 23.
Figure 26:
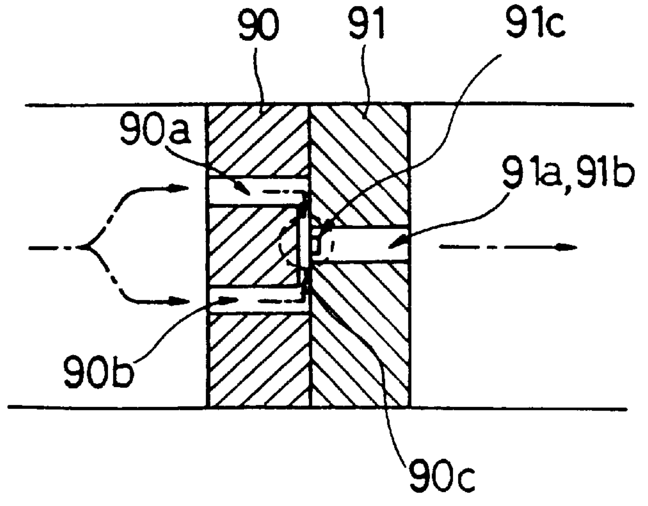
FIG. 26 is a vertical cross-sectional diagram showing the construction of a conventional fine particle producing device.

FIG. 24 is an enlarged cross section of the block train FB2, and FIG. 25 is an exploded view of one block 80 of the block train FB2 sandwiched by two partitioning blocks 81. As illustrated in FIGS. 24 and 25, each block 80 is constructed of a hollow cylindrical outer shell 80*a* and a generally cylindrical core element 80*b* which is fitted into the outer shell 80*a*. The aforementioned groove-like fluid branching channel 80*c* and the fluid colliding channel 80*d* are formed on the upstream and downstream sides of the core element 80*b*. The cylindrical surface of the core element 80*b* is cut at both ends of each fluid channel 80*c*, 81*d*, forming a pair of cut portions 80*e* which connect the fluid branching channel 80*c* and the fluid colliding channel 80*d*.

On the other hand, each partitioning block 81 is formed of a disklike member in which the aforementioned through hole 81*a* passes along the central axis. Two partitioning blocks 81 placed on the upstream and downstream sides of each block 80 cover the fluid branching channel 80*c* and the fluid colliding channel 80*d*. The through hole 81*a* of a partitioning block 81 placed on the upstream side of a particular block 80 serves as the fluid inlet for the block 80, whereas the through hole 81*a* of a partitioning block 81 placed on the upstream side of the block 80 becomes the fluid outlet for that block 80. This construction also causes successive collisions and mixing of streams of a fluid to be treated within a sealed casing 61.

The fine particle producing devices 60, 83 described above provide a increased particle size reducing effect and enable adjustment of the mixing ratio of each liquid feedstock and, therefore, droplets of a dispersed phase which is mixed at a desired ratio would be divided into remarkably fine particles of uniform size without requiring a dedicated mixing facility.

Results of emulsification tests carried out by using the aforementioned fine particle producing devices 60, 83 are described below. Results of tests conducted under the same test conditions by using a mixer (manufactured by Nippon Seiki Seisakusho Co., Ltd.) and a conventional fine particle producing device (manufactured by N Corp.) are also presented to provide comparative examples. The conventional fine particle producing device is constructed such that fluid streams are caused to collide with each other at a joint of straight flow channels which are connected together with a 90-degree phase difference. The measuring equipment and evaluation method used for the testing were the same as used for evaluating the device of the first embodiment.

(a) Emulsification Tests

1. Contents of Sample (1) Soybean oil, 10 wt % (manufactured by Kanto Chemical Co., Ltd.)

(2) Lecithin derived from soybean, 0.5 wt % (manufactured by Kanto Chemical Co., Ltd.)

(3) Purified water, 89.5 wt %

2. Pretreatment Procedure (1) A specified amount of soybean lecithin was added to a specified amount of soybean oil and the soybean lecithin was dissolved in the soybean oil.

(2) The mixture obtained in step (1) above was added to a specified amount of purified water and a resultant mixture was stirred for one minute by using a bench mixer (Model AM-9 manufactured by Nippon Seiki Seisakusho Co., Ltd.) which was set to 5000 r.p.m. to achieve preliminary emulsification.

(3) Median of particle diameters after preliminary emulsification: 26.72 micrometers (b) Dispersion and Particle Size Reduction Tests 1. Contents of Sample (1) Zinc oxide, 30 wt % (fine particle zinc oxide manufactured by Hakusui Chemical Industry Co., Ltd.)

(2) Demole EP, 2 wt % (manufactured by Kao Corporation)

(3) Purified water, 68 wt %

2. Pretreatment Procedure (1) Demole EP was added to a specified amount of purified water and dissolved therein.

(2) Zinc oxide was added to the mixture obtained in step (1) above and a resultant mixture was stirred for five minutes by the aforementioned bench mixer which was now set to 15000 r.p.m. to achieve preliminary dispersion.

(3) Median of particle diameters after preliminary dispersion: 0.69 micrometers

Emulsification Test Results

| Device tested | Treatment conditions | Particle size distribution Median dia. ($\mu$m) | Particle size distribution 10%/90% dia. ($\mu$m) |
|---|---|---|---|
| Device of | 100 kgf/cm$^2$ - 1 pass | 2.21 | 0.82/2.31 |
| This | 100 kgf/cm$^2$ - 5 passes | 1.55 | 0.76/2.13 |
| Invention | 100 kgf/cm$^2$ - 3 passes | 1.13 | 0.67/1.19 |
| Device | 300 kgf/cm$^2$ - 1 pass | 1.21 | 0.69/2.15 |
| This | 300 kgf/cm$^2$ - 3 passes | 0.78 | 0.52/1.83 |
| Invention | 300 kgf/cm$^2$ - 5 passes | 0.51 | 0.33/1.04 |
| Device of | 600 kgf/cm$^2$ - 1 pass | 0.79 | 0.65/1.52 |
| This | 600 kgf/cm$^2$ - 3 passes | 0.62 | 0.42/1.25 |
| Invention | 600 kgf/cm$^2$ - 5 passes | 0.38 | 0.28/1.05 |
| Device of | 800 kgf/cm$^2$ - 1 pass | 0.68 | 0.45/1.04 |
| This | 800 kgf/cm$^2$ - 3 passes | 0.46 | 0.27/0.85 |
| Invention | 800 kgf/cm$^2$ - 5 passes | 0.24 | 0.16/0.84 |
| Device of | 1200 kgf/cm$^2$ - 1 pass | 0.48 | 0.25/0.95 |
| This | 1200 kgf/cm$^2$ - 3 passes | 0.23 | 0.15/0.65 |
| Invention | 1200 kgf/cm$^2$ - 5 passes | 0.07 | 0.03/0.14 |
| Device of | 1800 kgf/cm$^2$ - 1 pass | 0.39 | 0.19/0.85 |
| This | 1800 kgf/cm$^2$ - 3 passes | 0.13 | 0.04/0.56 |
| Invention | 1800 kgf/cm$^2$ - 5 passes | 0.03 | 0.07/0.12 |
| Mixer | 5000 r.p.m. - 5 min. | 1.84 | 0.64/28.09 |
| | 5000 r.p.m. - 10 min. | 1.30 | 0.62/10.14 |
| | 5000 r.p.m. - 20 min. | 1.21 | 0.59/4.65 |
| | 5000 r.p.m. - 30 min. | 1.19 | 0.57/4.32 |
| Device of | 1200 kgf/cm$^2$ - 1 pass | 0.43 | 0.22/0.99 |
| N Corp. | 1200 kgf/cm$^2$ - 3 passes | 0.31 | 0.16/0.67 |
| | 1200 kgf/cm$^2$ - 5 passes | 0.18 | 0.10/0.36 |

The emulsification test results presented above prove that the fine particle producing devices 60, 83 could provide an enhanced particle size reducing effect and produce fine particles of uniform size with a small range of particle size distribution, compared to the conventional mixer and fine particle producing device.

Dispersion and Particle Size Reduction Test Results

| Device tested | Treatment conditions | Particle size distribution Median dia. ($\mu$m) | Particle size distribution 10%/90% dia. ($\mu$m) |
|---|---|---|---|
| Device of | 800 kgf/cm$^2$ - 3 passes | 0.49 | 0.28/0.97 |
| This invention | 800 kgf/cm$^2$ - 5 passes | 0.31 | 0.17/0.66 |
| Device of | 1200 kgf/cm$^2$ - 3 passes | 0.31 | 0.18/0.56 |
| This invention | 1200 kgf/cm$^2$ - 5 passes | 0.08 | 0.04/0.13 |
| Device of | 1800 kgf/cm$^2$ - 3 passes | 0.19 | 0.09/0.42 |
| This invention | 1800 kgf/cm$^2$ - 5 passes | 0.05 | 0.03/0.11 |
| Mixer | 15000 r.p.m. - 15 min. | 0.41 | 0.11/1.12 |
| | 15000 r.p.m. - 30 min. | 0.39 | 0.11/1.09 |
| Device of | 1200 kgf/cm$^2$ - 3 passes | 0.36 | 0.11/0.62 |
| N Corp. | 1200 kgf/cm$^2$ - 5 passes | 0.21 | 0.07/0.39 |

The dispersion and particle size reduction test results presented above prove that the fine particle producing devices 60, 83 could provide an enhanced particle size reducing effect and produce fine particles of uniform size with a small range of particle size distribution, compared to the conventional mixers and fine particle producing devices.

As is apparent from the foregoing discussion, the fine particle producing devices of the present invention exhibit stable particle size reducing performance for an extended period of time by reducing abrasion of those portions of flow guiding blocks where fluid streams collide. Since these fine particle producing devices provide an improved particle size reducing effect, the high-pressure pump can be reduced in size and power, making it possible to achieve energy savings.

Further, the flow guiding blocks of the fine particle producing devices are not required to have high abrasion-resistant properties because abrasion of their fluid colliding portions is decreased according to the invention. This would serve to reduce manufacturing costs the fine particle producing devices.

In the fine particle producing device 8 according to the first embodiment of the invention, the flow rate of a fluid to be treated that flows through the colliding curved channels 10*e*, 10*f* of the fluid inflow block 10 can be altered simply by varying the diameter of the turbulent flow passage 11*a* formed in the intermediate block 11. Since the fluid inflow block 10 and the fluid outflow block 12 are arranged with the intermediate block 11 placed in between, there is no need to arrange upstream and downstream colliding channels in close contact and at right angles with each other. It is therefore possible to eliminate the need for precise relative positioning of the fluid inflow and outflow blocks 10, 12 and the need for special machining work for such positioning.

The fine particle producing device 20 according to the second embodiment of the invention can create effective collisions of fluid streams with reduced pressure loss, thereby producing extremely fine particles in a stable manner.

In conventional fine particle producing systems, it is generally impossible to accomplish emulsification or dispersion in a single-pass process but it is required to reduce the size of droplets of a dispersed phase to such a level that the dispersed phase can pass through a nozzle in a fluid path by using a mixer. In the fine particle producing system of the third embodiment of the invention, however, a particle size reducing process can be completed with a single pass through the system, because a fluid to be treated is preprocessed by the pretreatment unit 40. If a plurality of pretreatment units 40 are connected in series and the clearance t1 between the circular plates 44 and 48 of each successive pretreatment unit 40 is made progressively smaller along the fluid flow, the fluid is subjected to a multi-stage particle size reducing pretreatment process. In this alternative configuration, the particle size is reduced in successive steps and the dispersed phase will eventually be divided into extremely fine particles.

If a variable displacement pump is connected to the upstream side of the pretreatment unit 40 as the pump 7, it becomes possible to adjust both fluid pressure and flow rate. This would make it possible to perform various forms of particle size reducing processes depending on the type of substance to be reduced to fine particles.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A fine particle producing device comprising:

a cylindrical sealed casing having an inlet port and an outlet port;

a plurality of blocks mounted in series within said cylindrical sealed casing, said blocks having channels which forcibly alter flow directions of a fluid to be treated, the fluid containing a substance to be divided into fine particles being introduced into said cylindrical sealed casing through its inlet port in a high-pressure state and guided through the channels of said blocks to create multiple fluid streams, which are converted into converging high-speed fluid streams, caused to collide with each other to produce fine particles of the substance, and discharged from said cylindrical sealed casing through its outlet port;

said blocks including a fluid inflow block, an intermediate block and a fluid outflow block, each formed into a disklike shape;

said fluid inflow block having through holes for separating the fluid to be treated into a plurality of fluid'streams flowing parallel to an axial direction, said channels including a first S-shaped channel formed in a downstream side surface of said fluid inflow block which comes in contact with said intermediate block, the first S-shaped channel connecting downstream openings of the through holes in an S shape to provide the fluid streams with a rotating force, and a turbulence pocket forming a closed-bottom cylindrical hole at a middle part of the first S-shaped channel;

said intermediate block having a turbulent flow passage formed at a location corresponding to the turbulence pocket formed in said fluid inflow block; and said fluid outflow block having a turbulence pocket forming a closed-bottom cylindrical hole at a location corresponding to the turbulent flow passage, said channels including a second S-shaped channel extending from the turbulence pocket formed in said fluid outflow block toward its periphery, and a plurality of through holes formed parallel to the axial direction and extending from each end of the second S-shaped channel.

2. A fine particle producing device comprising:

a cylindrical sealed casing having an inlet port and an outlet port;

a plurality of blocks mounted in series within said cylindrical sealed casing, said blocks having channels which forcibly alter flow directions of a fluid to be treated, the fluid containing a substance to be divided into fine particles being introduced into said cylindrical sealed casing through its inlet port in a high-pressure state and guided through the channels of said blocks to create multiple fluid streams, which are converted into converging high-speed fluid streams, caused to collide with each other to produce fine particles of the substance, and discharged from said cylindrical sealed casing through its outlet port;

at least one of said blocks having curved channel portions for guiding the converging high-speed fluid streams and a turbulence pocket formed at a position where said curved channel portions are joined for temporarily holding fluid turbulence caused by collision of the high-speed fluid streams, said curved channel portions together forming a circular channel, the turbulence pocket being located inside the circular channel to form a fluid colliding region therein, and fluid squirting openings formed in a wall separating the circular channel and the turbulence pocket from each other through which the high-speed fluid streams are introduced into the turbulence pocket in fanlike jets.

3. A fine particle producing device comprising:

a cylindrical sealed casing having an inlet port and an outlet port;

a plurality of blocks mounted in series within said cylindrical sealed casing, said blocks having channels which forcibly alter flow directions of a fluid to be treated, the fluid containing a substance to be divided into fine particles being introduced into said cylindrical sealed casing through its inlet port in a high-pressure state and guided through the channels of said blocks to create multiple fluid streams, which are converted into converging high-speed fluid streams, caused to collide with each other to produce fine particles of the substance, and discharged from said cylindrical sealed casing through its outlet port, at least one of said blocks having curved channel portions for guiding the converging high-speed fluid streams and a turbulence pocket formed at a position where said curved channel portions are joined for temporarily holding fluid turbulence caused by collision of the high-speed fluid streams; and a pretreatment unit connected to the inlet port of said fine particle producing device, said pretreatment unit including:

a cylindrical sealed structure having an inlet port and an outlet port;

a pair of plates arranged face to face with a clearance in between within said cylindrical sealed structure along its axial direction;

a fluid passage regulating mechanism for moving one of said pair of plates in the axial direction;

a fluid inflow passage for directing the fluid to be treated from a peripheral area of said pair of plates toward their middle part, thereby producing converging high-speed fluid streams and causing them to collide with each other; and a fluid outflow passage for sending fluid masses after collision toward the outlet port of said cylindrical sealed structure.

4. A fine particle producing system according to claim 3 wherein each of said plates is formed of a hard material.

5. A fine particle producing system according to claim 3 wherein a plurality of said pretreatment units are connected in series, and wherein the clearance between said pair of plates of each successive pretreatment unit is made progressively smaller along the direction of fluid flow.

* * * * *